United States Patent
Gharpure et al.

(10) Patent No.: US 11,526,671 B2
(45) Date of Patent: Dec. 13, 2022

(54) READING PROGRESS ESTIMATION BASED ON PHONETIC FUZZY MATCHING AND CONFIDENCE INTERVAL

(71) Applicant: GOOGLE LLC, Mountain View, CA (US)

(72) Inventors: Chaitanya Gharpure, Santa Clara, CA (US); Evan Fisher, San Francisco, CA (US); Eric Liu, Redwood City, CA (US); Peng Yang, San Jose, CA (US); Emily Hou, Mountain View, CA (US); Victoria Fang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/610,475

(22) PCT Filed: Sep. 4, 2018

(86) PCT No.: PCT/US2018/049401
§ 371 (c)(1),
(2) Date: Nov. 1, 2019

(87) PCT Pub. No.: WO2020/050820
PCT Pub. Date: Mar. 12, 2020

(65) Prior Publication Data
US 2021/0182488 A1    Jun. 17, 2021

(51) Int. Cl.
*G06F 40/284* (2020.01)
*G09B 17/00* (2006.01)
(Continued)

(52) U.S. Cl.
CPC ......... *G06F 40/284* (2020.01); *G09B 17/003* (2013.01); *G10L 15/187* (2013.01); *G10L 15/26* (2013.01); *G06N 7/02* (2013.01)

(58) Field of Classification Search
CPC ... G06F 40/284; G09B 17/003; G10L 15/187; G10L 15/26; G10L 2015/025; G06N 7/02
See application file for complete search history.

(56) References Cited

U.S. PATENT DOCUMENTS 5,329,608 A * 7/1994 Bocchieri ............ G10L 15/187
                                                704/E15.02
8,744,856 B1    6/2014 Ravishankar
(Continued)

FOREIGN PATENT DOCUMENTS

CA    2792336    9/2011
CA    2912243    5/2016
(Continued)

OTHER PUBLICATIONS

Hagen, A., "Advances in children's speech recognition with application to interactive literacy tutors", 2006, Available from ProQuest Dissertations and Theses Professional. Retrieved from https://dialog.proquest.com/professional/docview/305355457?accountid=131444 (Year: 2006).*

(Continued)

*Primary Examiner* — Eric Yen
(74) *Attorney, Agent, or Firm* — Lowenstein Sandler LLP

(57) ABSTRACT

An example method for identifying a reading location in a text source as a user reads the text source aloud includes determining phoneme data of the text source, the text source comprising a sequence of words; receiving audio data comprising a spoken word associated with the text source; comparing, by a processing device, the phoneme data of the text source and phoneme data of the audio data; and identifying a location in the sequence of words based on the comparing phoneme data.

20 Claims, 9 Drawing Sheets

(51) Int. Cl.
  *G10L 15/187* (2013.01)
  *G10L 15/26* (2006.01)
  *G06N 7/02* (2006.01)

(56) References Cited

U.S. PATENT DOCUMENTS

| | | | |
|---|---|---|---|
| 9,548,052 B2 | 1/2017 | King et al. | |
| 10,586,369 B1 | 3/2020 | Roche et al. | |
| 2003/0069729 A1* | 4/2003 | Bickley | G10L 15/08 |
| | | | 704/E15.014 |
| 2003/0191643 A1 | 10/2003 | Belenger et al. | |
| 2005/0065790 A1* | 3/2005 | Yacoub | G10L 15/32 |
| | | | 704/231 |
| 2008/0022189 A1 | 9/2008 | Kaiser | |
| 2010/0028843 A1 | 2/2010 | Currington et al. | |
| 2011/0124264 A1 | 5/2011 | Garbos | |
| 2011/0153330 A1 | 6/2011 | Yazdani et al. | |
| 2012/0001923 A1 | 1/2012 | Weinzimmer et al. | |
| 2012/0078630 A1 | 3/2012 | Hagen et al. | |
| 2012/0310642 A1 | 12/2012 | Cao et al. | |
| 2013/0047059 A1 | 2/2013 | Phillips et al. | |
| 2014/0039887 A1 | 2/2014 | Dzik et al. | |
| 2014/0040713 A1* | 2/2014 | Dzik | G10L 15/26 |
| | | | 715/203 |
| 2014/0082501 A1 | 3/2014 | Bae et al. | |
| 2014/0327610 A1 | 11/2014 | Athavale et al. | |
| 2015/0170648 A1* | 6/2015 | King | G06F 3/0485 |
| | | | 704/235 |
| 2016/0225187 A1 | 8/2016 | Knipp et al. | |
| 2016/0358620 A1 | 12/2016 | Hammersley et al. | |
| 2017/0228026 A1 | 8/2017 | Goslin et al. | |
| 2018/0018373 A1 | 1/2018 | Yazdian et al. | |
| 2018/0293221 A1* | 10/2018 | Finkelstein | G06N 20/00 |
| 2019/0189019 A1 | 6/2019 | Hammersley et al. | |
| 2019/0361842 A1* | 11/2019 | Wood | H04L 9/3239 |
| 2020/0111491 A1* | 4/2020 | Guy | G10L 15/30 |
| 2021/0183378 A1 | 6/2021 | Gharpure et al. | |
| 2021/0183379 A1 | 6/2021 | Gharpure et al. | |

FOREIGN PATENT DOCUMENTS

| | | |
|---|---|---|
| KR | 20060054678 | 5/2006 |
| WO | 2004093078 | 10/2004 |
| WO | 2017160498 | 9/2017 |

OTHER PUBLICATIONS

International Search Report and Written Opinion for Application No. PCT/US2018/049401 dated Apr. 26, 2019, 6 pages.
International Search Report and Written Opinion for Application No. PCT/US2018/048188 dated Mar. 5, 2020, 9 pages.
International Search Report and Written Opinion for Application No. PCT/US2018/049205 dated Apr. 12, 2019, 13 pages.
International Search Report and Written Opinion for Application No. PCT/US2018/049408 dated May 2, 2019, 14 pages.

* cited by examiner

READING PROGRESS ESTIMATION BASED ON PHONETIC FUZZY MATCHING AND CONFIDENCE INTERVAL

TECHNICAL FIELD

This disclosure relates to the field of computer-based recognition of human speech and, in particular, to enhancing the ability of a computer device to identify a reading location in a text source as a user reads the text source aloud.

BACKGROUND

The capabilities and usage of virtual assistants are expanding rapidly. Traditional virtual assistants include some form of computer human interface that enables a human to interact with the virtual assistant and cause the virtual assistant to perform a task or service. Virtual assistants often record and understand human speech and can respond by synthesizing a reply. The virtual assistants may be initiated in response to a touch or gesture based command or may continuously analyze its environment to detect a spoken command. When the command is detected, the virtual assistant may respond or perform one or more actions.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular embodiments of the disclosure or any scope of the claims. Its sole purpose is to present some concepts of the disclosure in a simplified form as a prelude to the more detailed description that is presented later.

In a first aspect of the present disclosure there is provided a method. The method may comprise determining (e.g. calculating, retrieving, or receiving) phoneme data of a text source, the text source comprising a sequence of words. The method may comprise receiving audio data comprising a spoken word associated with the text source. The method may comprise comparing, by a processing device, the phoneme data of the text source and phoneme data of the audio data. The method may comprise identifying a location in the sequence of words based on the comparing of the phoneme data.

Optionally, the text source may be a book and the location may be a current reading location in the book. The phoneme data of the text source may comprise a phonetic encoding of the sequence of words. The phonetic encoding may comprise one or more sequences of phonetic values. Comparing the phoneme data may comprise calculating a phoneme edit distance between phoneme data of the audio data and phoneme data of the text source. Comparing phoneme data may comprise calculating a numeric value representing a similarity between two or more sequences of phonetic values. Comparing phoneme data may comprise performing a fuzzy match between phoneme data corresponding to the audio data and the phoneme data of the text source. The comparing may comprise comparing the audio data and the text source in the absence of converting the audio data to text using speech recognition. Identifying the location in the sequence of words may comprise determining the spoken word matches a word in the sequence of words based on the phoneme data of text source; and may comprise selecting the location of the word based on the phoneme data of the text source. The method may comprise accessing textual data of the text source. The method may comprise generating the phoneme data based on the textual data. The method may comprise associating the phoneme data with the text source.

According to a second aspect of the present disclosure is a system comprising a processing device. The processing device may be configured to determine phoneme data of a text source, the text source comprising a sequence of words. The processing device may be configured to receive audio data comprising a spoken word associated with the text source. The processing device may be configured to compare the phoneme data of the text source and phoneme data of the audio data. The processing device may be configured to identify a location in the sequence of words based on the comparison of the phoneme data.

The system may comprise data storage. The system may comprise a communications system for communicating over a network, such as a local area and/or wide area network. The system may be, may be comprised in or may be configured to implement a virtual assistant. The system may be configured to implement the method of the first aspect.

According to a third aspect of the present disclosure is a computer program product configured such that, when processed by a processing device, the computer program product causes the processing device to perform the method of the first aspect.

The individual features and/or combinations of features defined above in accordance with any aspect of the present disclosure or below in relation to any specific embodiment may be utilized, either separately and individually, alone or in combination with any other defined feature, in any other aspect or embodiment. Furthermore, the present disclosure is intended to cover apparatus configured to perform any feature described herein in relation to a method and/or a method of using or producing, using or manufacturing any apparatus feature described herein.

BRIEF DESCRIPTION OF THE DRAWINGS

The present disclosure is illustrated by way of example, and not by way of limitation, in the figures of the accompanying drawings.

Figure 1:
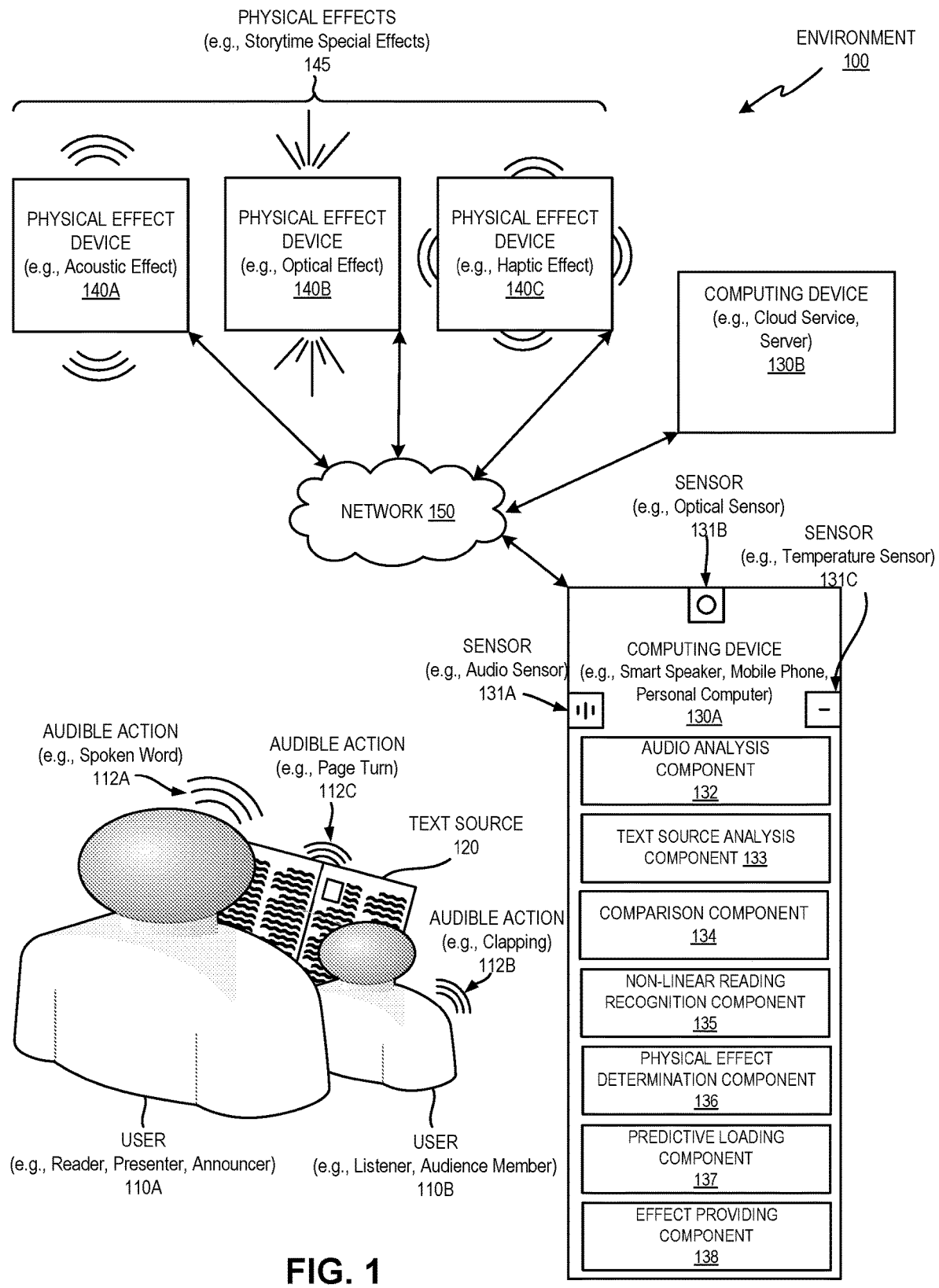
FIG. 1 illustrates an example environment with one or more computing devices in accordance with an implementation of the disclosure.

These drawings may be better understood when observed in connection with the following detailed description.

DETAILED DESCRIPTION

Modern computing devices often provide features to detect and understand human speech. The features may be associated with a virtual assistant that may be accessible via a computing device that is resource constrained, such as smart speaker, mobile phone, smart watch, or other user device. The computing device may be associated with a microphone that can record the human speech and may use a combination of local and remote computing resources to analyze the human speech. Analyzing speech is typically a resource intensive operation and the computing device may be configured to perform some of the processing local to a computing device and has some of processing performed remotely at a server or via a cloud service. Many virtual assistants use some form of a remote speech recognition service that takes audio data as input and converts the audio data into text that is returned to the computing device.

Many technical problems arise when a computing device attempts to use traditional virtual assistant features to follow along as a user reads a text source aloud. Some of the problems arise because traditional virtual assistant features perform speech recognition to translate audio into text. The speech recognition typically involves an acoustic step that translates the audio into phonemes and a language step that translates the phonemes into text (e.g. into words). The language step often waits for subsequent spoken words to establish context before translating a spoken word into text. The language step introduces an unnecessary time delay and consumes additional computing resources. In addition, using the recognized text to perform a traditional text based comparison with the text source may be more error prone then performing a phonetic comparison (e.g., phoneme comparison). This problem often arises because many words that sound the same or sound similar may be spelled very differently and would yield false negatives when textually compared. In addition, a traditional textual comparison may not properly account for situations where a user may jump around when reading a text source. For example, portions of the text source may be skipped, repeated, or new content may be added. This may make it challenging to identify a current reading location within the text source and to correctly detect a reading speed.

Aspects and implementation of the present technology address the above and other deficiencies by providing enhancements to enable a computing device to detect a current reading location in a text source as the text source is being read aloud. In one example, the technology may avoid the language step of traditional speech recognition by comparing the phoneme data derived from the audio with phoneme data derived from the text source. The text source may be a book, magazine, presentation, speech, script, or other source that includes a sequence of words. The technology may receive audio data that includes the words spoken by a user and may convert the audio data to phoneme data locally or with the assistance of a remote server (e.g., cloud service). The phoneme data of the audio and the text source may then be compared via a phonetic comparison as opposed to a more traditional textual comparison. The phonetic comparison may be accompanied with fuzzy matching to identify a location within the sequence of words (e.g., current reading location).

Systems and methods described herein include technology that enhances the technical field of computer-based recognition of human speech. In particular, the technology disclosed enhances the latency, accuracy, and computing resources required to identify a current reading position. This may be the result of modifying the speech analysis process (e.g., speech recognition) to avoid translating the audio data into text (e.g. spoken words into textual words). The technology may use a speech analysis process that translates the audio into phoneme data using an acoustic model but may avoid the language step that translates the phoneme data to text (e.g. into words) using a language model. Avoiding the language step reduces latency and the consumption of computing resources. Performing phoneme comparisons and using fuzzy matching may enhance the accuracy in identifying a current reading position because it may better compensate for non-linear reading of the text source (e.g., skipping, repeating, or adding content). The above processes may also benefit the real time identification of reading position and may contribute to the provision of physical effects, such as audio, haptic, and/or visual effects at or closer to an appropriate time.

The technology discussed below includes multiple enhancements to a computing device with or without virtual assistant features. The enhancements may be used individually or together to optimize the ability of the computing device to follow along while a text source is being read aloud and to provide special effects to supplement an environment of a listening user. In one example, the environment may include a parent reading a book aloud to one or more children. In another example, the environment may include one or more users providing a presentation, speech, or other performance to an audience. In either example, the technology may be used to enhance the environment with special effects based on an analysis of data associated with the text source. The special effects may be synchronized with particular portions of the text source, such as a particular spoken word or a page turn.

FIG. 1 illustrates an example environment 100 that includes a text source that is being read aloud and one or more devices that supplement the environment to enhance the listening experience of a user, in accordance with one or more aspects of the disclosure. Environment 100 may be a physical environment such as an indoor setting (e.g., bedroom, conference room), outdoor setting (park, field), or other location. Environment 100 may be referred to as a ubiquitous computing environment or pervasive computing environment and may include embedded computing functionality. The embedded computing functionality may provide ambient intelligence that is sensitive and responsive to the presence of humans. In one example, environment 100 may include one or more users 110A and 110B, a text source 120, one or more computing devices 130A and 130B, and one or more physical effect devices 140A-C.

Users 110A and 110B may include human users that are able to perceive content of a text source. User 110A may be an individual user that is reading the content of the text source or may be multiple users that are each reading a portion of one or more text sources. User 110A may be referred to as a reader, presenter, announcer, actor, other term, or a combination thereof. User 110B may listen to content of the text source that is being read aloud. User 110B may or may not read along with user 110A. In one example, user 110A may be a parent that is reading to a child user 110B. In another example, user 110A may include one or more presenters speaking to one or more users 110B that are members of an audience. In either example, the content of text source 120 may be announced for one or more other users to hear.

Text source 120 may be any source of content that can be interpreted and read aloud. Text source 120 may include content that contains numbers, characters, words, symbols, images, or a combination thereof. The content may be arranged into a sequence that can be uttered by a user when read or after being memorized. Text source 120 may be a physical or electronic book, magazine, presentation, speech, script, screenplay, memorandum, bulletin, article, blog, post, message, other arrangement of text, or a combination thereof. In the example of FIG. 1, text source 120 may be a children's book that includes a sequence of words and images that can be read aloud to a child.

Audible actions 112A-C may be any action or combination of actions that produce a sound that can be detected by a user or computing device. Audible actions 112A-C may be heard, perceived, or observed by an ear of a user or by audio sensors associated with a computing device (e.g., microphones). As shown in FIG. 1, there may be multiple types of audible actions and they may depend on where the sound originates from. Audible actions 112A may be a first type of audible action that includes a vocal sound (e.g., an utterance) that may originate from a human voice or a computer synthesized voice. The vocal sound may be a linguistic vocal sound (e.g., spoken word), a non-linguistic vocal sound (e.g., laughing, crying, coughing), other sound, or a combination thereof. Audible action 112B may be a second type of audible action that includes non-vocal sounds that originate from the user or another source and may include clapping, finger snapping, other sound, or a combination thereof. Audible action 112C may be a third type of audible action that includes non-vocal sounds that are caused by a user interacting with an object and may include a page turning, a book closing, a door opening/closing, an object falling, tapping on the floor, other sound, or a combination thereof. One or more of the audible actions 112A-C may be detected by one or more of sensors 131A-C.

Sensors 131A-C may be coupled to the computing device 130A and may enable the computing device to sense aspects of environment 100. Sensors 131A-C may include one or more audio sensors (e.g., microphones), optical sensors (e.g., ambient light sensor, camera), atmospheric sensor (e.g., thermometer, barometer, hydrometer), motion sensors (e.g., accelerometer, gyroscope, etc.), location sensors (e.g., global positioning system sensors (GPS)), proximity sensors, other sensing devices, or a combination thereof. In the example shown in FIG. 1, sensor 131A may be an audio sensor, sensor 131B may be an optical sensor, and sensor 131C may be a temperature sensor. One or more of sensors 131A-C may be internal to computing device 130A, external to computing device 130A, or a combination thereof and may be coupled to computing device 130A via a wired or wireless connection (e.g., Bluetooth®, WiFi®).

Computing device 130A may be any computing device that is capable of receiving and processing data derived from sensors 131A-C. Computing device 130A may function as a voice command device and provide access to an integrated virtual assistant. In one example, computing device 130A may include a smart speaker, mobile device (e.g., phone, tablet), a wearable device (e.g., smart watch), a digital media player (e.g., smart TV, micro console, set-top-box), a personal computer (e.g., laptop, desktop, workstation), home automation device, other computing device, or a combination thereof. In some implementations, computing device 130A may also be referred to as a "user device," "consumer device," or "client device." Data generated by sensors 131A-C may be received by computing device 130A and may be processed locally by computing device 130A or may be transmitted remotely from computing device 130A to another computing device (e.g., 130B).

Computing device 130A may include one or more components for processing the sensor data. In the example shown in FIG. 1, computing device 130A may include an audio analysis component 132, a text source analysis component 133, a comparison component 134, a non-linear reading recognition component 135, a physical effect determination component 136, a predictive loading component 137, and an effect providing component 138. In other examples, one or more of these components or one or more features of the components may be performed by another computing device (e.g., computing device 130B). These components will be discussed in more detail in regards to FIGS. 2-4 and may function to detect a current reading location and to instruct one or more physical effect devices 140A-C to enhance the listening experience.

Physical effect devices 140A-C may be any computing device capable of causing or providing a physical effect. The physical effect may be perceived via a sense of users 110A and 110B (e.g., hearing, sight, touch, smell, and taste). Each of the physical effect devices 140A-C may produce one or more of the physical effects and computing device 130A may function as one or more of the physical effect device 130A-C. Physical effect devices 140A-C may provide a physical effect 145 or may instruct another device to provide physical effect 145. In one example, one or more of the physical effect devices 140A-C may be part of or integrated with a home automation system or may be separate from a home automation system. As shown in FIG. 1, physical effect device 130A may include a speaker or other device capable of causing or emitting an acoustic effect. Physical effect device 130B may include one or more light sources (e.g., lightbulbs, pixels) or other device capable of altering the amount of light present in environment 100 (e.g., motorized shades or blinds). Physical effect device 130C may include one or more devices that can cause a haptic effect and may include a vibration source (e.g., massaging chair), a fan producing wind (e.g., ceiling fan or air conditioner), a heating or cooling source (e.g., thermostat), other device, or a combination thereof.

Physical effect 145 may be any modification of environment 100 that can be perceived by a user or a computing device and may include acoustic effects, haptic effects, optical effects, other effects, or a combination thereof. An acoustic effect may be a physical effect that relates to sound and can be propagated via sound waves. An acoustic effect may include human or animal sounds (e.g., voices or noises), atmospheric sounds (e.g., thunder, rain, wind, or other weather sounds), musical sounds (e.g., instruments, background music, theme music), object sounds (e.g., knocking, door opening, window shutting, glass breaking, object crashing, automobile running), other sound effects, or a combination thereof. A haptic effect may be a physical effect that relates to a user's sense of touch. The haptic effect may include a breeze, a vibration, a temperature change, other touch sensation, or a combination thereof. An optical effect may be a physical effect that relates to light and can be propagated via visible electromagnetic radiation. The optical effect may include the increase or decrease in ambient lighting, light flashes, animations, other change in an amount of light, or a combination thereof. The optical effect may originate from lamps (e.g., ceiling lamps, desk lamps), flash lights (e.g., phone light), window coverings (e.g., blinds or shades), projectors, electronic displays, holographic displays, lasers, other light sources, or a combination thereof. Other effects may include smell or taste related effects (e.g., olfactory effects).

Computing device 130B may be a server that is coupled to computing device 130A and may be local to or remote from environment 100. Computing device 130B may include one or more computing devices (such as rackmount servers, a server computer, a personal computer, a mainframe computer, a laptop computer, a tablet computer, a desktop computer, a router, etc.), data stores (e.g., hard disks, memories, databases), networks, software components, and/or hardware components. In one example, computing device 130B may function to provide remote processing and may function as a speech processing service as discussed in more detail in regards to FIG. 2. In another example, computing device 130B may provide computing device 130A with access to media items.

The media items may correspond to physical effects, text sources, profile information, speech models, instructions, other data, or a combination thereof. Example media items may include, but are not limited to, digital sound effects, digital music, digital animations, social media information, electronic books (e-books), electronic magazines, digital newspapers, digital audio books, digital video, digital photos, website content, electronic journals, web blogs, real simple syndication (RSS) feeds, electronic comic books, software applications, etc. In some implementations, a media item may be referred to as a content item and may be provided over the Internet and/or via computing device 130A (e.g., smart speaker). As used herein, "media," "media item," "digital media," "digital media item," "content," and "content item" can include an electronic file or record that can be loaded or executed using software, firmware, or hardware configured to present the content to one or more users in environment 100. In one implementation, computing device 130B may store media items using one or more data stores and provide the media items to computing device 130A over network 150.

Network 150 may include one or more of a private network (e.g., a local area network (LAN), a public network (e.g., the Internet), a wide area network (WAN)), a wired network (e.g., Ethernet network), a wireless network (e.g., Wi-Fi or bluetooth connection), a cellular network (e.g., a Long Term Evolution (LTE) network), routers, hubs, switches, server computers, and/or a combination thereof.

In general, functions described in one implementation as being performed by computing device 130A, computing device 130B, or physical effect devices 140A-C may be performed by one or more of the other devices in other implementations. In addition, the functionality attributed to a particular component can be performed by different or multiple components operating together. The computing device 130A and 130B may also be accessed as a service provided to other systems or devices through appropriate application programming interfaces. Although implementations of the disclosure are discussed in terms of a smart speaker, the implementations may also incorporate one or more features of a cloud service or content sharing platform.

In situations in which the systems discussed herein collect personal information about client devices or users, or may make use of personal information, the users may be provided with an opportunity to control whether the computing devices can collect user information (e.g., information about a user's audio input, a user's preferences, a user's current location, social network, social actions, activities, or profession), or to control whether and/or how to receive content from a computing device that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the computing device.

Figure 2:
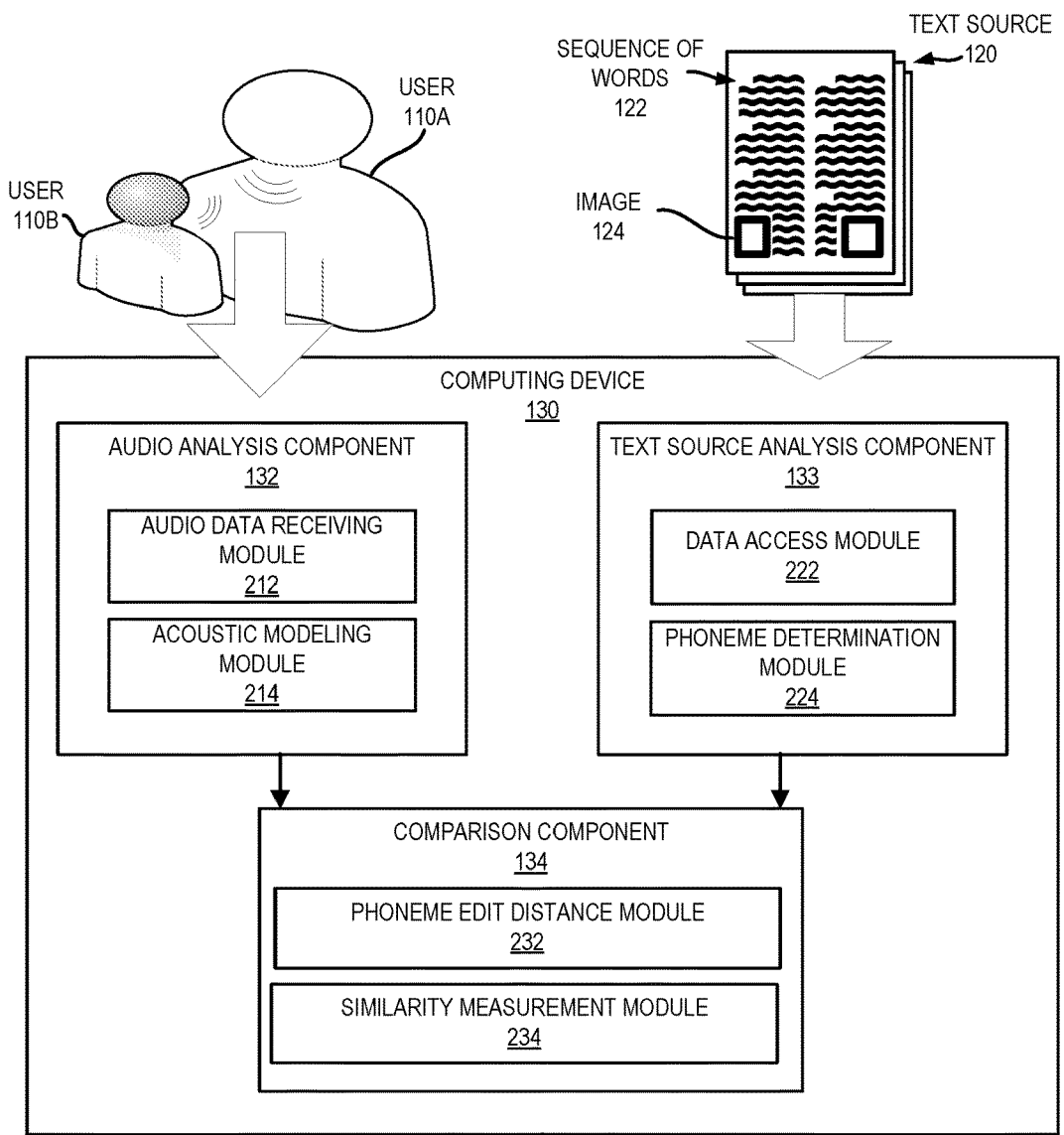
FIG. 2 is a block diagram illustrating an example computing device with components and modules for comparing phoneme data derived from user input and phoneme data derived from a text source in accordance with an implementation of the disclosure.
Figure 3:
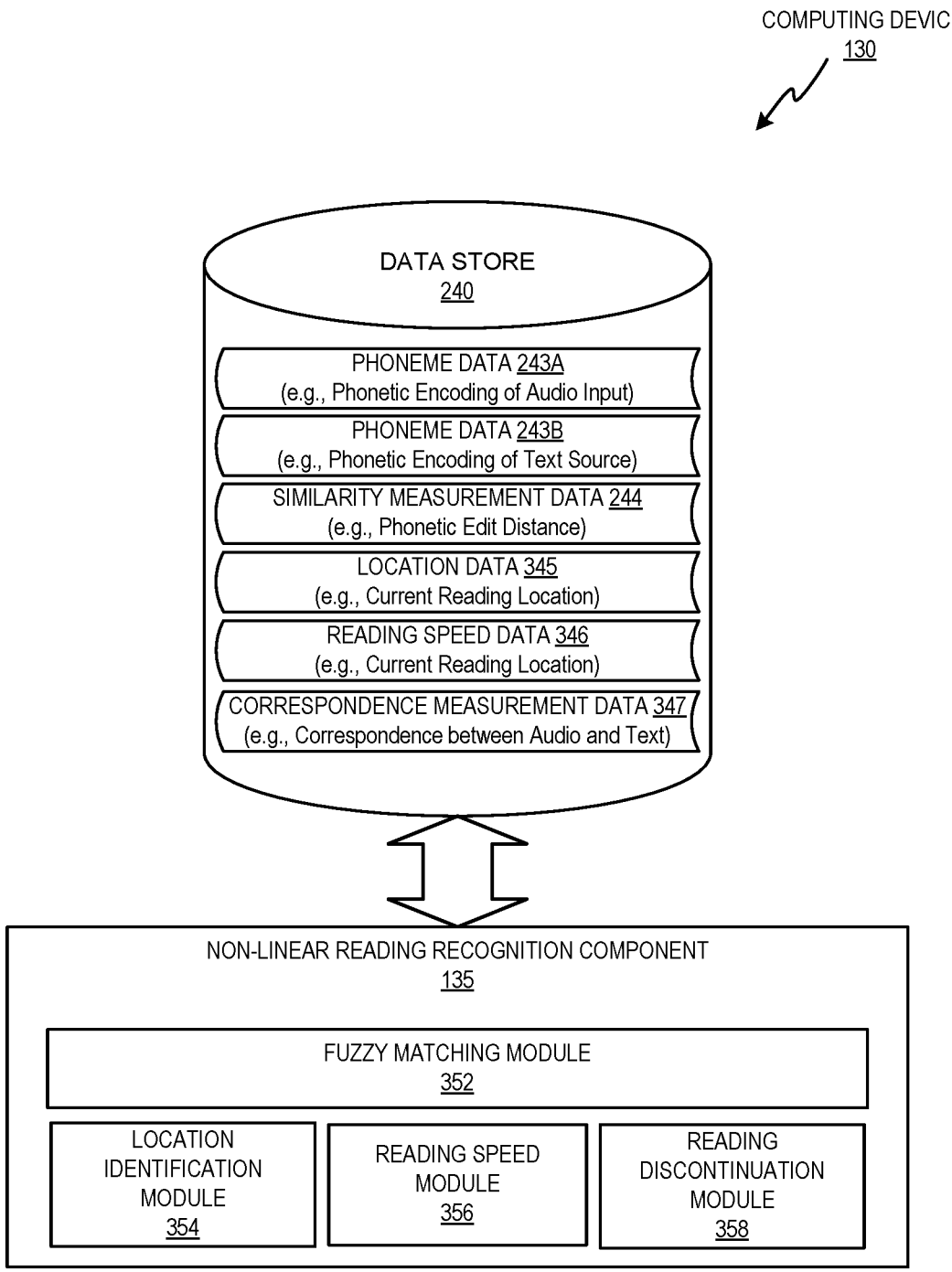
FIG. 3 is a block diagram illustrating an example computing device with components and modules for identifying a location in the text source based on the audio input of a user in accordance with an implementation of the disclosure.
Figure 4:
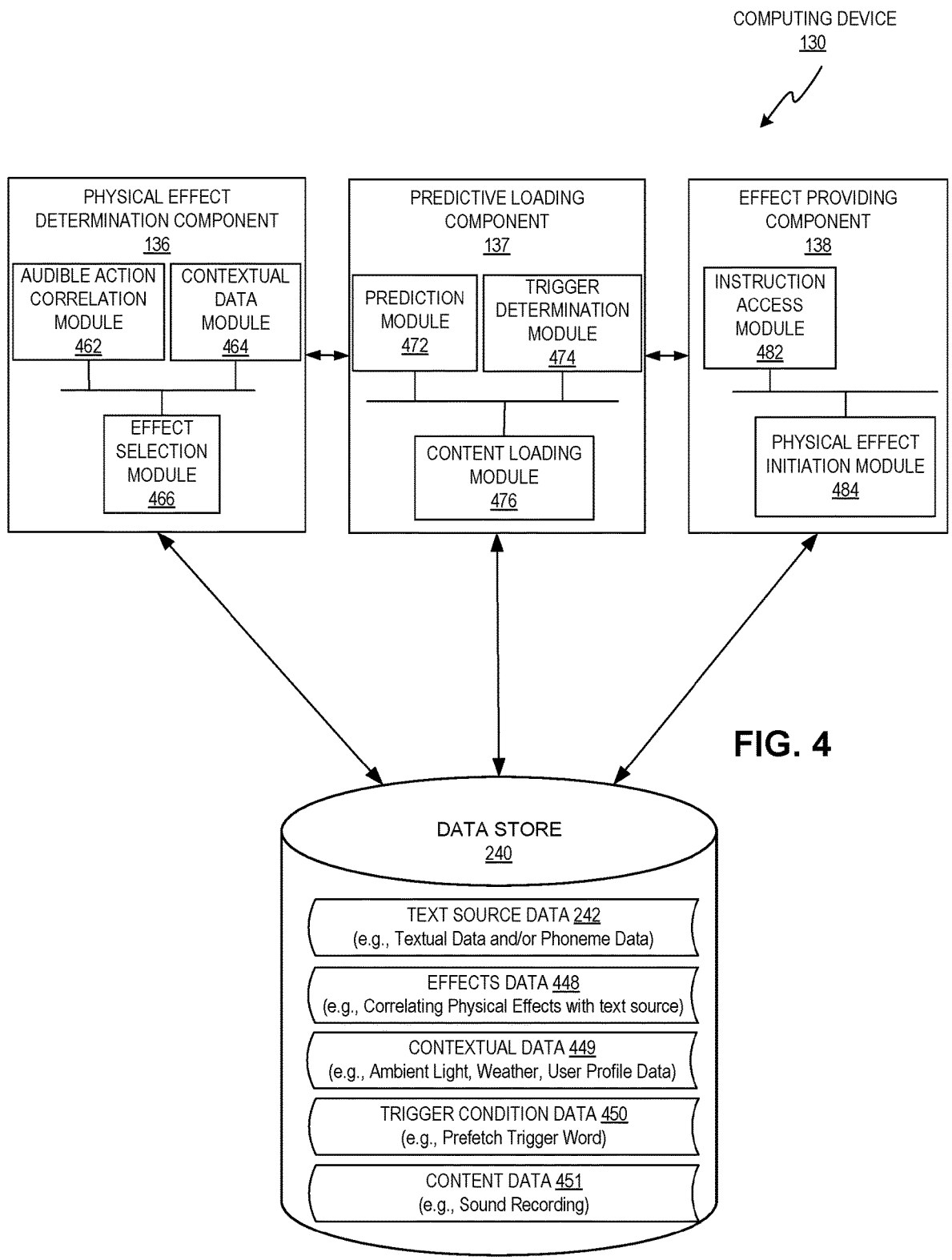
FIG. 4 is a block diagram illustrating an example computing device with components and modules for providing physical effects to enhance an experience of one or more users in accordance with an implementation of the disclosure.

FIG. 2-4 depict block diagrams illustrating an exemplary computing device 130 that can detect a reading location within a text source and supplement the environment with physical effects to enhance a listening experience, in accordance with one or more aspects of the disclosure. Computing device 130 may be the same or similar to computing devices 130A, computing device 130B, or a combination thereof. FIG. 2 discusses features that enable computing device 130 to receive and compare audio data of a user with data of a text source. FIG. 3 discusses features that enable computing device 130 to analyze data to detect a reading location based on the audio data and text source data. FIG. 4 discusses features that enable computing device 130 to provide physical effects to modify the environment of one or more listeners. The components and modules provided in FIGS. 2-4 are exemplary and more or less components or modules may be included without loss of generality. For example, two or more of the components may be combined into a single component, or features of a component may be divided into two or more components. In one implementation, one or more of the components may reside on different computing devices (e.g., a client device and a server device).

Referring to FIG. 2, computing device 130 may include an audio analysis component 132, a text source analysis component 133, a comparison component 134, and a data store 240. Audio analysis component 132 may receive and access the audio data extracted from an environment while a user reads a text source aloud. In one example, audio analysis component 132 may include an audio data receiving module 212 and an acoustic modeling module 214.

Audio data receiving module 212 may receive audio data 241 that includes one or more audible actions of a user. The audio data may include spoken words, page turns, or other audible actions that are captured from an environment of a user. Audio data 241 may be received directly from one or more of the sensors in the form of an audio signal or may be received indirectly from a data store 240 or other computing device after the sensors store the audio data 241. Audio data 241 may be in any digital or analog format and may be accessed or received from within one or more storage objects (e.g., files, database records), data streams (e.g., audio stream, video stream), data signals, other data transmission or storage protocol, or a combination thereof. Audio data 241 may be an audio recording and may be segmented into one or more durations (e.g., portions, chunks, or other units) before, during, or after it is analyzed by acoustic modeling module 214.

Acoustic modeling module 214 may analyze audio data 241 using an acoustic model to identify phoneme data 243A. The acoustic model may represent known relationships between audible actions and phonemes. A phoneme may be a unit of sound and may correspond to a sound pattern of an audible action (e.g., spoken word). A phoneme may be a linguistic unit, non-linguistic unit, other unit, or a combination thereof. Acoustic modeling module 214 may translate the audio data into phonemes that are stored in data store 240 as phoneme data 243A.

Phoneme data 243A may include values that represent the one or more phonemes extracted from audio data 241. Phoneme data 243A may represent a sequence of phonemes using a standard or proprietary notation. The notation may include a particular arrangement of one or more bits, bytes, symbols, or characters that represent a phoneme. In one example, the particular arrangement may include a symbol placed beside or between one or more delimiters. The delimiters may include slashes, brackets, pipes, parenthesis, commas, tabs, spaces, new line character, other separator, or a combination thereof. The phonemes may be arranged into a sequence of phonemes that represent a portion of one or more audible actions.

Text source analysis component 133 may receive and analyze data related to text source 120. Text source 120 may be determined in view of user input that is text based, speech based, touch based, gesture based, or other manner of user input. For example, a user may identify text source 120 by saying the name of the text source 120 (e.g., title or author of a book), by typing and searching for the text source, by selecting a displayed text source, other selection mechanism, or a combination thereof. In the example shown in FIG. 2, text source analysis component 133 may include a data access module 222 and a phoneme determination module 224.

Data access module 222 may access data associated with text source 120 and may store the accessed data as text source data 242. Data access module 222 may access data from one or more sources, which may include a local source, a remote source, or a combination thereof. A local source may be storage of computing device 130 and a remote source may be storage of a computing device that is accessible over a network connection. In one example, the remote source may be the same or similar to computing device 130B (e.g., server or cloud service). The local or remote source may store data of one or media items discussed above and computing source may access the data. The data may then be analyzed, filtered, combined, or modified and subsequently stored as text source data 242.

Text source data 242 may be any data associated with text source 120 and may be provided by or accessible from an author, publisher, distributor, partner, a remote server, a third party service, other source, or combination thereof. Text source data 242 may include descriptive data, textual data, phoneme data, other data, or a combination thereof. The descriptive data may indicate the title, summary, source (e.g., author, publisher, distributor), table of content (e.g., chapters, sections, pages), index (e.g., phrases, page indicators), other data, or a combination thereof.

The textual data may include one or more words of text source 120. In one example, the words may be organized as a sequence of words 122 with or without one or more images 124. The textual data may be a data structure that arranges the words in the same or similar manner as they are read by a user (e.g., series of consecutive words). The sequence of words may be limited to only the words appearing in text source 120 or may be supplemented with words or data that indicate the existence or content of non-textual information (e.g., illustrations, images, tables, formatting, paragraph, pages). In another example, the words may also or alternatively be arranged in an index data structure that indicates unique words that are present in the text source 120 but are not arranged consecutively in a manner spoken by a user. Either data structure may be supplemented with additional information that may include a word location within the text source (e.g., page, line, slide), a number of occurrences, variations of the word (e.g., tense, plural), other data, or a combination thereof. In one example, text source 120 may be a physical book and text source data 242 may include words from a corresponding electronic book (e.g., e-book), a third party service, other source, or a combination thereof.

The phoneme data of text source 120 may be the same or similar to phoneme data 243B and may be a phonetic encoding of text source 120 that is in a format that is the same or similar to the phoneme data derived from the audio (e.g., phoneme data 243A). In the example discussed above, phoneme data 2439 of text source 120 may be included as part of text source data 242 and be accessed by phoneme determination module 224. In another example, phoneme data 243B may be absent from text source data 242 and may be generated by phoneme determination module 224.

Phoneme determination module 224 may determine the phoneme data for a particular text source 120. This may involve phoneme determination module 224 accessing existing phoneme data 243B from a remote source, generating phoneme data 243B based on textual data, or a combination thereof. When generating phoneme data 243B, phoneme determination module 224 may access and analyze textual data of text source data 242 and convert (e.g., derive, translate, transform, encode) the textual data into phoneme data 243B. The generated phoneme data may then be associated with text source 120 for future use by computing device 130 or by one or more other computing devices. In one example, the textual data may include a sequence of words and the generated phoneme data may include a phonetic encoding that includes sequences of phonetic values representing the sequence of words. The same sequence of phonetic values may correspond to two words that sound the same but are spelled different (e.g., homophones). Likewise, a different sequence of phonetic values may correspond to words that sound different even though they are spelled the same (e.g., homographs).

As discussed above, phoneme data 243A and 243B may each include a sequence of phonemes that are represented using a standard or proprietary notation. The notation may be referred to as a phonetic transcription or a phoneme transcription and may include a particular arrangement of phoneme values that represent a linguistic segment. The linguistic segment may be any discrete unit that can be identified, either physically or auditorily, in a stream of speech. A phoneme value may include one or more symbols, characters, bytes, bits, other value, or combination thereof. In one example, a phoneme value may be represented by one or more Unicode characters, American Standard code for Information Interchange (ASCII) characters, other characters, or a combination thereof. A sequence of phoneme values may represent a single word and each individual phoneme value may represent a portion of the word. For example, a first sequence of phonemes may be /$\theta_A$m/ and represent the spoken word "thumb" and a second sequence of phonemes me be /d$_A$m/ and represent the spoken word "dumb." In the examples discussed below, phoneme data 243A and 243B may include a sequence of values and each value may represent a phoneme of a phoneme vocabulary.

The phoneme vocabulary may include the set of possible phoneme values for one or more languages. The phoneme vocabulary may be an alphabetic system of phonetic notation and may represent qualities of speech that are part of oral language: phones, phonemes, intonation and the separation of words and syllables. The phoneme vocabulary may or may not also represent additional qualities of speech and variations of speech annunciations (e.g., lisps, mispronunciations, accents, dialects). The phoneme vocabulary may be the same or similar to a phoneme alphabet, character set, lexis, lexicon, other variation, or a combination thereof. In one example, the phoneme vocabulary may be the based on the International Phonetic Alphabet (IPA). IPA symbols may be composed of one or more elements related to letters and diacritics. For example, the sound of the English letter ⟨t⟩ may be transcribed in IPA with a single letter, [t], or with a letter plus diacritics, [tʰ]. Delimiters (e.g., slashes) may be used to signal broad or phonemic transcription; thus, /t/ may be less specific than, and could refer to, either [tʰ] or [t], depending on the context and language. In other examples, the phoneme vocabulary may be the same or similar to the Extended Speech Assessment Methods Phonetic Alphabet (X-SAMPA), Kirshenbaum (e.g., ASCII-IPA, erkIPA), other phoneme vocabulary, or a combination thereof.

Comparison component 134 may compare the audio of user 110A with the content of text source 120. The examples discussed below compare the audio and the text source using their corresponding phoneme data and in the absence of converting the audio into text using speech recognition. Other examples may also or alternatively use textual data, descriptive data, audio data, other data, or a combination thereof. The comparisons may be performed by computing device 130, by a remote computing device (e.g., cloud service), or a combination thereof. In one example, comparison component 134 may select a phoneme sequence derived from the audio and compare it with multiple phonemes sequences derived from the text source. In another example, comparison component 134 may compare a phoneme sequence of the text source with multiple phoneme sequences derived from the audio. In either example, the calculation of the similarity measurement data may be based on a phoneme edit distance.

Phoneme edit distance module 232 may quantify how similar two phoneme sequences are to one another by determining a minimum number of operations required to convert one phoneme sequence into an exact match of the other phoneme sequence. The operations may include any modification of a phoneme value (e.g., symbol) within one of the sequence of phonemes. Example operations may include primitive operations such as phoneme removals, insertions, substitutions, transpositions, other operation, or a combination thereof. In the example discussed above, the first sequence of phonemes may be /θ$_A$m/ and represent "thumb" and a second sequence of phonemes may be /d$_A$m/ and represent "dumb." Although the two words differ by two letters, their phoneme edit distance is the numeric value 1 because converting the sequences to an exact match involves a substitution of a single phoneme (e.g., θ with d). In one example, the phoneme edit distance may be a linear edit distance that is the same or similar to a Levenshtein distance. The Levenshtein distance may be based on a minimum number of removal, insertion, or substitution operations needed to make the two phoneme sequences equal. In other examples, the phoneme edit distance may also or alternatively include transposition or other operations. In either example, the phoneme edit distance may be a numeric value that is used to determine the similarity measurement data 244.

Similarity measurement module 234 may access data of phoneme edit distance module to deter mine the similarity or dissimilarity between the audio and the text source. Similarity measurement module 234 may analyze data of phoneme edit distance module to calculate the similarity measurement data 244. Similarity measurement data 244 may represent the similarity between two or more sequences of phonemes (e.g., phonetic representation of words or sets of words) and may include numeric data, non-numeric data, other data, or a combination thereof. Similarity measurement data 244 may be based on the edit distance of one or more sequences of phonemes. In one example, the similarity measurement data 244 may include the numeric value of the phoneme edit distance. In another example, similarity measurement data 244 may include a probabilistic value derived from the numeric value of the phone edit distance. For example, similarity measurement data may be a percentage, ratio, or other value that is based on one or more phoneme edit distances and one or more other values. The other value may be the number of phonemes in the one or more phoneme sequences or in a portion of the text source.

Data store 240 may be a memory (e.g., random access memory), a cache, a drive (e.g., solid state drive, hard drive, flash drive), a database system, or another type of component or device capable of storing data. Data store 240 may also include multiple storage components (e.g., multiple drives or multiple databases) that may span one or more computing devices (e.g., multiple server computers).

FIG. 3 depicts a block diagram illustrating exemplary components that enable computing device 130 to analyze data discussed above to determine a reading location or the absence of a reading location within the text source. As discussed above, portions of the audio may not match the text source identically because the user may add, skip, repeat, or reorder content of the text source when reading aloud. As a result, the phoneme data derived from the audio and the phoneme data derived from the text source may be challenging to compare and align. In the example shown in FIG. 1, computing device 130 may include a non-linear reading recognition component 135 that enables the computing device to determine a location within the text source that best aligns with the audio data. In one example, non-linear reading recognition component 135 may include a fuzzy matching module 352, a location identification module 354, a reading speed module 356, and a reading discontinuation module 358.

Fuzzy matching module 352 may enable computing device 130 to determine whether there is a match between the audio and the text source. The match may be the same or similar to a probabilistic match, best match, a closest match, or any match that may not be an exact match but satisfies a predetermined threshold. In one example, determining a match between the audio and text source may involve detecting that a fragment of audio comprises one or more words of the text source. The match may be detected even if the audio or text source contains other words, is missing words, or includes variations of the words (e.g., mispronunciation, missing plural). The match may be referred to as a fuzzy match or an approximate match and may be detected using fuzzy matching logic. The fuzzy matching logic may be used to compare sequences of phoneme values and may operate at a syllable level segment, a word level segment, a phrase level segment, a sentence level segment, other segment, or a combination thereof. In one example, the fuzzy matching may perform the fuzzy matching using an audio segment that has a predetermined length. The predetermined length may be customizable and may be any duration (e.g., 3+ seconds) or any number of word tokens (e.g., 3-4 words). Having a predetermined length that is much smaller than length of the text source may enhance accuracy and performance when accounting for non-linear reading.

Fuzzy matching module 352 may impose one or more constraints to determine the match. In one example, detecting a match may involve using one or more global unweighted costs. A global unweighted cost may be related to the total number of primitive operations necessary to convert a candidate sequence of phonemes (e.g., candidate pattern from text source) to a selected sequence of phonemes (e.g., pattern from audio). In another example, detecting a match may involve specifying a number of operations of each type separately, while still others set a total cost but allow different weights to be assigned to different primitive operations. Fuzzy matching module 352 may also apply separate assignments of limits and weights to individual phoneme values in the sequence.

Location identification module 354 may access data of fuzzy matching module 352 to identify a location within the text source that corresponds to the audible actions of the audio (e.g., spoken words). In one example, the text source may be a book for children and the location may be a reading location within a sequence of words of the book. In other examples, the location may be within a speech, presentation, script, screenplay, other text source, or a combination thereof. In either example, the location may be a past, current, or future reading location within the text source and may be stored as location data 345. The location data may be numeric or non-numeric data that identifies one or more particular phonemes, words, paragraphs, pages, sections, chapters, tables, images, slides, other locations, or a combination thereof.

Location identification module 354 may determine an audible action matches with multiple different portions of the text source. This may occur when the same word or phrase (e.g., sequence of phonemes) is repeated multiple times within the text source. Location identification module 354 may detect the spoken word by analyzing the phoneme data and detect the spoken words match with multiple candidate locations within the text source. Location identification module 354 may select one or more of the multiple candidate locations based on data of the fuzzy matching module 352. The location identification module 354 may further narrow the candidate locations by selecting a particular location based on phoneme data of the audio that occurred before, during, or after the spoken word (e.g., expanding predetermined segment length or using adjacent segments).

Reading speed module 356 may access and analyze location data 345 to determine a reading speed of the user. The reading speed data may be determined in view of the location data, text source data, audio data, other data, or a combination thereof and may be stored as reading speed data 346. The reading speed may be based on a portion of location data 345 that identifies at least two locations in the text source. The locations may correspond to particular times and determining the reading speed may be based on a quantity of words and a quantity of time between the two or more locations. In one example, the quantity of words may be based on the content of the text source and may not take into account content that was added, skipped, or repeated by the user. In another example, the quantity of words may be based on the content of text source and also on content of the audio. This may be advantageous because the content of the audio may indicate words were added, skipped, repeated, other action, or a combination thereof. In either example, reading speed module 356 may update reading speed data to represent the reading speed of the user over one or more durations of time.

Reading discontinuation module 358 may access and analyze any data discussed above to detect whether the user has discontinued reading the text source or is still reading the text source. This may be challenging because the user may have stopped reading the text source but is discussing a concept related to the text source. As a result, there may be an overlap in the spoken words and the content of the text source. Detecting a discontinuation of reading may be important because it may enable computing device to avoid recording a private discussion. Reading discontinuation module 358 may determine whether the user has discontinued reading the text source by calculating one or more correspondence measures.

A correspondence measure may indicate the similarity or dissimilarity between a segment of audio and a corresponding portion of the text source. The correspondence measure may be a probabilistic value that indicates a probability that the segment of audio corresponds to the location of the text source. The probabilistic value may be a numeric or non-numeric value and may be same or similar to a percentage, ratio, decimal, or other value, or a combination thereof. In one example, the value may be between 0 and 1 (e.g., 0.97), 0 and 100 (e.g., 98), or other range of values. One end of the range may indicate that the segment of audio definitely corresponds to the location of the text source (e.g., 1.0 or 100) and the other range may indicate that the segment of the audio definitely does not correspond to the location of the text source (e.g., value of 0).

The correspondence measure may be based on or related to multiple similarity measurements. For example, both measurements may be used to compare or contrast data derived from the audio (e.g., phoneme data 243A) with data derived from the text source (e.g., phoneme data 243B). The similarity measurements (e.g., phoneme edit distances) may be used to compare or contrast a written word of the text source with a spoken word and the correspondence measure may be used to compare or contrast a set of written words with a set of words spoken over a duration of time. The duration of time of the audio (e.g., segment) may be any length of time and may include the set of words as well as one or more other audible actions (e.g., page turn, book close). In one example, the audio of the user may include a first duration and a second duration and the reading discontinuation module 358 may calculate one or more correspondence measures for the first duration and one or more correspondence measures for the second duration. The correspondence measures may be stored as correspondence measurement data 347. In other examples, the correspondence measure may also or alternatively take into account one or more signals such as the absence of speech input for a duration of time, the absence of recognition of story text or the recognition of specific words or phrases that may indicate a stop. The words or phrase may include "let's stop reading," "let's finish tomorrow," "OK, I'm done," "let's pause," other phrase, or a combination thereof.

Reading discontinuation module 358 may compare the correspondence measurement data 347 for each duration against one or more predetermined thresholds. In response to the correspondence measurement data 347 for the first duration not satisfying the threshold (e.g., above or below the threshold), the reading discontinuation module 358 may determine the duration of audio corresponds to the text source and that the user audio data corresponds to a user reading the text source. In response to the correspondence measurement data 347 for the second duration satisfying the threshold (e.g., below or above the threshold), the reading discontinuation may determine the duration of audio does not correspond to the text source and that the user has stopped reading the text source. In one example, determining the correspondence measure satisfies the threshold may indicate the audio data is absent a match with the data of the text source or that the audio data is different from content of the text source.

Reading discontinuation module 358 may perform one or more actions in response to determining that the user has discontinued reading the text source. In one example, reading discontinuation module 358 may transmit a signal to deactivate one or more microphones associated with computing device to avoid capturing or recording additional audio data. In another example, reading discontinuation module 358 may transmit a signal to cease analyzing the audio data (e.g., comparing audio data with the data of the text source). The latter example may record the audio but may not access or analyze the audio data. In yet another example, reading discontinuation module may cause computing device 130 to interact with the user before, during, or after transmitting the signal. For example, the computing device may interact with the user by providing a prompt (e.g., audio, visual, or a combination thereof). The prompt may ask the user whether to exit a storytime mode or may inform the user that the storytime mode has been exited and may or may not enable the user to re-enable the storytime mode.

FIG. 4 depicts a block diagram illustrating exemplary components that enable computing device 130 to provide physical effects to enhance the experience of a user. As discussed above, the physical effects may modify the environment and may include acoustic effects, haptic effects, optical effects, other effects, or a combination thereof. In the example shown, computing device 130 may include a physical effect determination component 136, a predictive loading component 137, and an effect providing component 138.

Physical effect determination component 136 enables computing device 130 to identify and provide physical effects that correspond to particular portions of the text source. In one example, physical effect determination component 136 may include an audible action correlation module 462, a contextual data module 464, and an effect selection module 466.

Audible action correlation module 462 may enable computing device to correlate particular physical effects with particular audible actions that are associated with the text source. Audible action correlation module 462 may determine the correlation based on effects data 448 for the text source. Effects data 448 may indicate which physical effects correspond to which portions of the text source. Effects data 448 may correlate a particular physical effect with either a particular location in the text source, with a particular audible action of a user, a particular triggering condition (discussed below), or a combination thereof. The location in the text source may relate to an audible action (e.g., spoken word or page flip) or may be unrelated to an audible action (e.g., user looking at a graphical image). In one example, effects data 448 may identify an audible action that includes a particular spoken word (e.g., dog) of the text source and the physical effect may involve initiating an acoustic effect (e.g., barking sound) corresponding to the spoken word. In another example, effects data 448 may identify an audible action (e.g., a page turn) and the physical effect may involve modifying an existing physical effect (e.g., readjusting the ambient sound, light, or temperature).

Effects data 448 may be accessible by computing device 130 or may be created by computing device 130. In one example, computing device 130 may access or receive effects data 448 directly or indirectly from an author, publisher, distributor, partner, third party service, other source, or combination thereof. Effects data 448 may be included within text source data 242 or may be separate from text source data 242. In another example, computing device 130 may create the effects data based on text source data 242. For example, audible action correlation module 462 may analyze textual data or phoneme data and identify physical effects that correspond to particular portions of the text source. In either example, effects data 448 may be stored in data store 240 for enhanced access by computing device 130.

Contextual data module 464 may enable computing device 130 to gather contextual data 449 associated with the user. Contextual data 449 may be based on an environment of the user and may be obtained using one or more sensors (e.g., sensors 131A-C). Contextual data 449 may also or alternatively be based on profile data about the user, which may be accessible to computing device 130 via direct user input or via a remote source (e.g., network connection with a content platform or social network). In one example, contextual data 449 may include sound data (e.g., ambient sound measurements), light data (e.g., ambient light measurements), time data (e.g., morning or night), calendar data (early appointment tomorrow), geographic location data (e.g., zip code, address, latitude/longitude), weather data (e.g., raining, lighting, thunder, windy, cloudy), user profile data (e.g., child's name, age, or gender), user audio feedback (e.g., child crying or clapping), other data, or a combination thereof.

Effect selection module 466 may enable computing device 130 to select and modify physical effects based on the effects data 448, contextual data 449, text source data 242, other data, or a combination thereof. Effect selection module 466 may be used to select a particular physical effect (e.g., acoustic effect) or to modify an attribute of a physical effect. The attribute may relate to a physical effect's intensity, timing, tone, transition (e.g., fade in/out), other feature, or a combination thereof. The intensity may be related to a magnitude of the modification to the environment and may relate the volume (e.g., loudness) or luminance (e.g., brightness) of the physical effect. The timing may relate to the speed or duration of the physical effect. Computing device 130 may select the physical effect based on the word of the text source and may update an attribute of the physical effect based on the contextual data. In one example, the contextual data may include sound data of an environment of the user and the physical effect may be an acoustic effect at a volume based on the sound data. In another example, the contextual data may include light data of an environment of the user and the physical effect may be an optical effect that modifies a luminance of a light source based on the light data (e.g., dim or brighten a light). In yet another example, the contextual data may include user profile data of a parent or a child and indicates an age of a listener and wherein the physical effect comprises an acoustic effect selected based on the age of the user (e.g., a more playful dog bark for a young child and a more serious dog bark for an older child).

Effect selection module 466 may use the contextual data to identify timing aspects related to the reading of the text source. For example, the time data or calendar data may be used to distinguish between the text source being read in the evening or being read in the morning. In the evening, effect selection module 466 may select physical effects that are more calming (e.g., less stimulating) to encourage a listener to get ready for bed. This may involve decreasing the brightness and volume settings for the acoustic and optical effects and/or selecting effects that have a lower tone (e.g., softer crash effects or whispers as opposed to shouting). In the morning, effect selection module 466 may select physical effects that are more stimulating to encourage a user to get ready for the day. This may involve increasing the brightness and volume settings for the acoustic and optical effects. The calendar data may also indicate whether the reading time is associated with a weekend or weekday or if there is an appointment coming up soon (e.g., later in the day or early the next morning). Either of these may affect how fast the user may read the text source and how long or often the physical effects should be provided.

Predictive loading component 137 may enable computing device 130 to predictively load content of a physical effect before it is needed. Predictive loading may speed up the ability of computing device 130 to provide the physical effect by loading the content of the physical effect prior to the physical effect being initiated. Predictive loading may be the same or similar to prefetching, pre-caching, cache prefetching, other concept, or a combination thereof. In one example, predictive loading component 137 may include a prediction module 472, a trigger determination module 474, and a content loading module 476.

Prediction module 472 may enable computing device 130 to predict a time that the user will reach a particular portion of a text source. For example, prediction module 472 may determine a time that a word of the text source will be spoken before the word is spoken by the user. The predicted time may be a time in the future and may be determined based on a reading speed of the user, a reading location of the text source, other data, or a combination thereof. In one example, the time may be calculated based on a user's reading speed (e.g., words per minute, pages per minute) and the difference (e.g., number of words, paragraphs, or pages) between a current reading location and a target location in the text source. In other examples, prediction module 472 may use a predictive model, machine learning, neural networks, or other technique to enhance the predictions based on current data, historical data, or a combination thereof.

Trigger determination module 474 may enable computing device 130 to determine a triggering condition associated with a particular physical effect. The triggering condition may be a loading triggering condition or an initiation triggering condition. A loading triggering condition indicates when to start loading the content of the physical effect. A initiation triggering condition indicates when to start providing (e.g., playing) the content of the physical effect. Either triggering condition may correspond to a particular time or a particular location within the text source and may be based on the effects data, text source data, other data, or a combination thereof. The particular time may be an absolute time (e.g., at 8:32:02 pm) or a relative time (e.g., 5 seconds before predicted time of word or page turn). The particular location may be a location within the text source that is prior to the word that the physical effect is to be aligned with. The particular location may be an absolute location (e.g., word 397) or a relative location (e.g., 5 words before word "bark").

The determination of the triggering condition may be based on one or more factors that are related to the content, computing device, user, other aspect of the environment, or a combination thereof. The factors related to the content may include the amount of content (e.g., 1 MB file size), the location of the content (e.g., remote storage), the format of the content (e.g., downloadable files, streaming chunks, or format that needs to be transcoded), the duration of the content (e.g., 2 second sound effect), other aspect of the content, or a combination thereof. The factors related to the computing device may correspond to the amount and/or availability of computing resources of computing device 130 or other computing device. The computing resources may include connection speed (e.g., networking bandwidth), storage space (e.g., available solid state storage), processing power (e.g., CPU speed or load), other computing resource, or a combination thereof. The factors related to the user may include the user's reading speed, current reading location, speech clarity, other aspect, or a combination thereof.

Trigger determination module 474 may use one or more of the factors to calculate a duration of time to load or provide the content of the physical effect. The duration of time related to loading the content may be referred to as a predicted load time and may or may not include the duration of time to provide (e.g., play) the content. In one example, trigger determination module 474 may determine the duration of time to load the content of the physical effect based on the size of the content and the network bandwidth of the computing device 130. Trigger determination module 474 may use the predicted load time to identify the particular time or location of the triggering condition. In one example, the triggering condition may be set to a time that is greater than or equal to the predicted time of the audible action (e.g., spoken word) minus the predicated load time (e.g., 5 seconds). In another example, the triggering condition may be set to be a location within the text source that is equal to or prior to a location that the physical effect is intended to align with. This may involve selecting a location in the text source based on the predicted load time and the reading speed. For example, if the user reads at a speed of 120 words per minute (i.e., 2 words a second) and the predicted load time is 5 seconds then the triggering location may be 10 or more words prior to the word that the physical effect should align with.

Content loading module 476 may enable computing device 130 to load the content of one or more physical effects in advance of the physical effect being initiated. Loading the content may involve computing device 130 transmitting or receiving one or more requests and responses and may involve downloading, streaming, copying, other operation, or a combination thereof. The content may include executable data (e.g., instructions), informational data (e.g., audio files or chunks), other data, or a combination thereof. The content may be stored by computing device 130 as content data 451 in data store 240. Computing device 130 may load the content of the physical effect from a local device (e.g., data store 240), a remote device (e.g., server or cloud service), or a combination thereof.

Effect providing component 138 may enable computing device 130 to provide the physical effect to modify the environment of a user. Effect providing component 138 may be initiated after the content for the physical effect is loaded and may be timed so that the physical effect is provided at a time that aligns with the audible action it is intended to align with. In one example, effect providing component 138 may include an instruction access module 482 and a physical effect initiation module 484.

Instruction access module 482 may access instruction data associated with the physical effect. The instruction data may include a set of one or more commands, operations, procedures, tasks, other instructions, or a combination thereof. The instructions may indicate the physical effect and one or more attributes for the physical effect.

Physical effect initiation module 484 may access the instruction data and execute the instruction data to initiate the physical effect. The physical effect initiation module 484 may initiate an instruction before, during, or after detecting the initiation triggering condition (e.g., audible action) that corresponds to the physical effect. In one example, the text source may include a particular word and initiating the physical effect may be in response to detecting the audio data comprises the word (e.g., matching phonemes). In another example, physical effect initiation module 484 may determine the initiation triggering condition to initiate the physical effect. The process to determine the triggering condition to initiate the physical effect may be the same or similar as the triggering condition used to initiate loading the content of the physical effect. The instruction may cause computing device 130 to provide the physical effect or may cause computing device 130 to communicate with one or more physical effect devices to provide the physical effect. In either example, computing device 130 may directly or indirectly cause the physical effect to modify the environment of the user to enhance the experience of a listening user.

In one example, physical effect initiation module 484 or effect selection module 466 may use one or more confidence thresholds to select and/or initiate a physical effect. The one or more confidence thresholds may be grouped into one or more confidence intervals that categorize the probability that the audio matches a particular location of the text source (e.g., spoken word matches word of text source). There may be any number of confidence interval and a first confidence interval may indicate that there is a low probability that the audio matches the text source location (e.g., >50%) and each successive confidence interval may be higher (e.g., >75%, >95%, etc). The effects data that correlate the physical effect with a location may also include a particular confidence threshold (e.g., minimum confidence interval). For example, providing a sound effect may be associated with a higher confidence interval then transitioning a background effect. Computing device 130 may determine if a confidence threshold is satisfied prior to selecting or initiating the physical effect. This may involve comparing the correspondence measure data, similarity measure data, other data associated with the fuzzy matching, or a combination thereof. In one example, a particular location in the text source may be associated with multiple different physical effects and each may correspond to a different confidence interval associated with the current reading location. When the confidence interval is higher (e.g., trust the current reading location is accurate) a particular acoustic effect may be initiated (e.g., a sound effect of a single dog barking at a higher volume) and when the confidence interval is lower (e.g., unsure current reading location is accurate) a different acoustic effect may be initiated (e.g., background noise of multiple dogs barking at a lower volume).

FIGS. 5-8 depict flow diagrams of respective methods 500, 600, 700, and 800 for enhancing the ability of a computing device to follow along as a text source is being read aloud and to provide special effects in real-time, in accordance with one or more aspects of the present disclosure. Method 500 may involve using phoneme data and fuzzy matching estimate reading progress. Method 600 may optimize the ability of the computing device to detect when a user has stopped reading from the text source and is having a private discussion. Method 700 may enable the computing device to provide physical effects that take into account the context of the user and the user's environment. Method 800 may enable the computing device to pre-cache content of the physical effects to reduce delay and better synchronize the physical effect with the audible actions associated with the text source.

The methods of FIGS. 5-8 and each of their individual functions, routines, subroutines, or operations may be performed by one or more processors of the computer device executing the method. In certain implementations, one or more of the methods may be performed by a single computing device. Alternatively, one or more of the methods may be performed by two or more computing devices, each computing device executing one or more individual functions, routines, subroutines, or operations of the method. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, the methods may be performed by one or more of the components in FIGS. 1-4.

Figure 5:
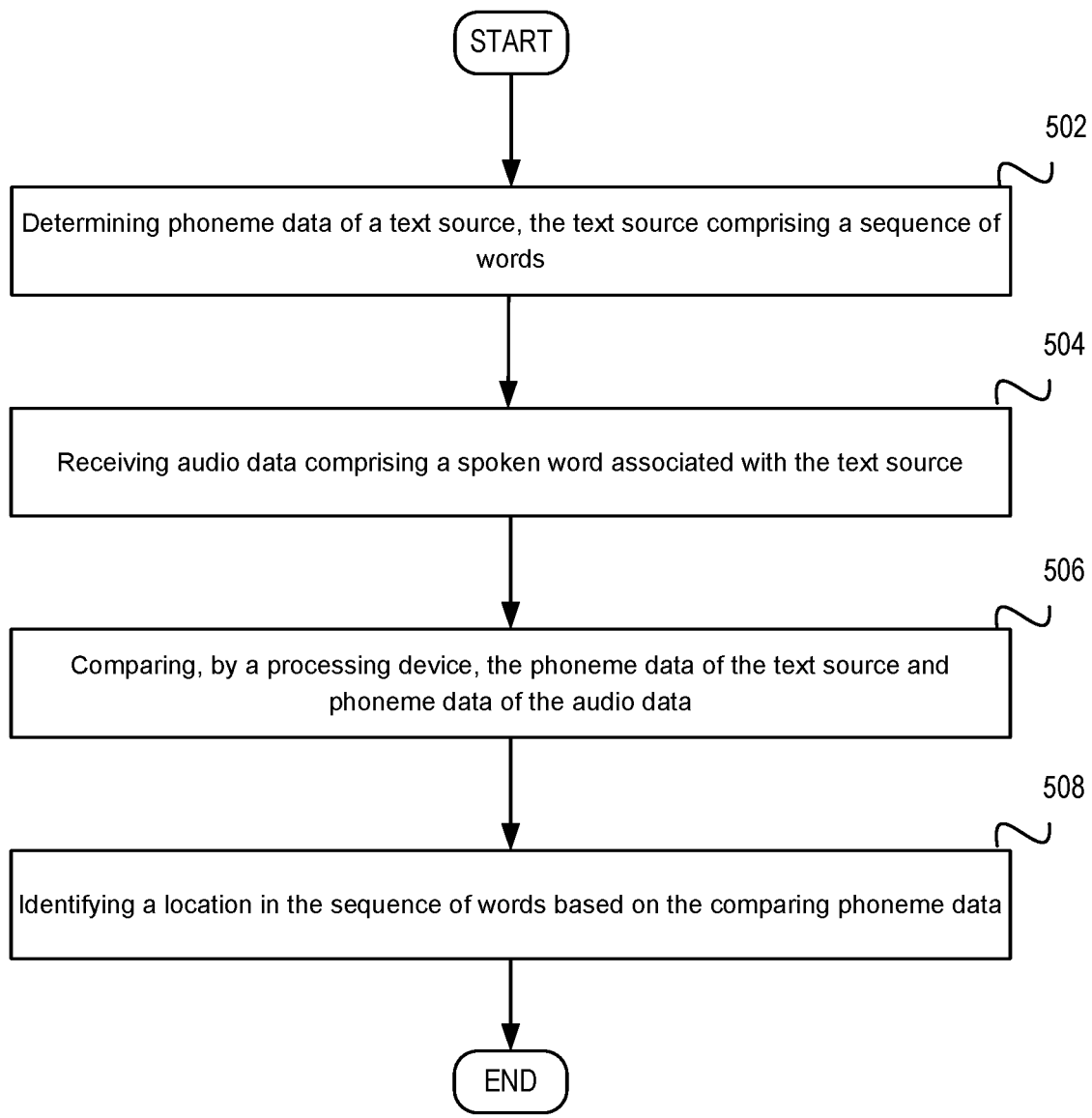
FIG. 5 is a flow diagram illustrating an example of method in accordance with an implementation of the disclosure.

Referring to FIG. 5, method 500 may be performed by processing devices of a client device (e.g., smart speaker), a server device (e.g., cloud service), other device, or a combination thereof and may begin at block 502. At block 502, the processing device may determine phoneme data of a text source. The text source may include a sequence of words and the phoneme data may be a phonetic encoding of the sequence of words that includes one or more sequences of phonetic values. Each of the phonetic values may correspond to a phoneme and the sequence of phonemes may correspond to a spoken word. The same sequence of phonetic values may correspond to words that sound the same but are spelled different (e.g., homophones) and different sequences of phonetic values may correspond to words that are spelled the same but sound different (e.g., homographs).

The processing device may access the phoneme data from a source of the text source or may generate the phoneme data for the text source. The processing device may generate the phoneme data by phonetically encoding the sequence of words. This may involve accessing textual data of the text source and generating (e.g., converting, transforming, deriving) the phoneme data based on the textual data. The phoneme data may then be associated with the phoneme data for future use.

At block 504, the processing device may receive audio data comprising a spoken word associated with the text source. The audio data may include one or more audible actions of a user and may include spoken words, page turns, or other audible actions that are captured from an environment of the user. In one example, the processing device may receive the audio data directly from one or more of the sensors in the form of an audio signal. In another example, the processing device may receive the audio data from a data store or another computing device. The audio data may be in any digital or analog format and may be accessed or received via one or more storage objects (e.g., files, database records), data streams (e.g., audio stream, video stream), data signals, other data transmission or storage protocol, or a combination thereof.

At block 506, the processing device may compare the phoneme data of the text source and phoneme data of the audio data. The comparison of the audio data and the text source may occur in the absence of converting the audio data to text (e.g. recognized words) using speech recognition and may involve comparing phoneme data corresponding to the audio data and phoneme data corresponding to the text source. The comparing may include calculating a numeric value representing a similarity between two or more sequences of phonetic values. The numeric value may be a phoneme edit distance between phoneme data of the audio data and phoneme data of the text source. The comparison may also involve performing fuzzy matching between phoneme data corresponding to the audio data and the phoneme data of the text source.

At block 508, the processing device may identify a location in the sequence of words based on the comparison of the phoneme data of the text source and the phone data of the audio. The identification of the location may involve determining a spoken word matches a word in the sequence of words of the text source. In one example, the text source may be a book and the location may be a current reading location in the book. Responsive to completing the operations described herein above with references to block 508, the method may terminate.

Figure 6:
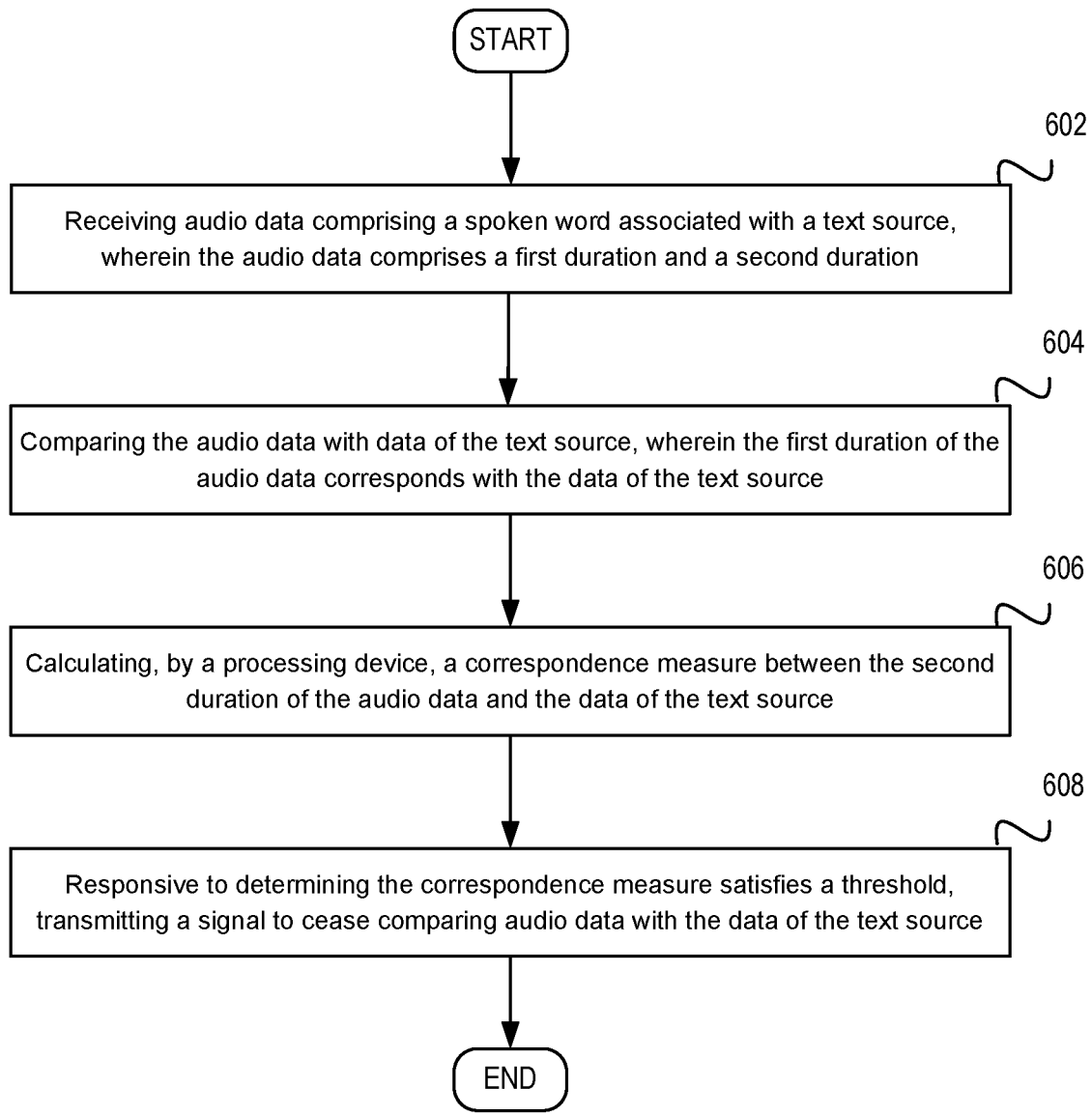
FIG. 6 is a flow diagram illustrating an example of method in accordance with an implementation of the disclosure.

Referring to FIG. 6, method 600 may be performed by the same processing device discussed above or a different processing device and may begin at block 602. At block 602, the processing device may receive audio data comprising a spoken word associated with a text source. The audio data may be segmented (e.g., tokenized, fragmented, partitioned, divided) into a first duration and a second duration. In one example, the text source may be a book and the first portion of the audio data may correspond to the content of the book (e.g., include a spoken word of the book) and the second portion of the audio data may not correspond to the content of the book (e.g., may be absent a spoken word from the book).

At block 604, the processing device may compare the audio data with data of the text source. The data of the text source may include phoneme data and comparing the audio data and the data of the text source may involve phoneme comparisons. In one example, comparing phoneme data may involve calculating a phoneme edit distance between the phoneme data of the text source and phoneme data of the audio data.

At block 606, the processing device may calculate a correspondence measure between the second duration of the audio data and the data of the text source. Calculating the correspondence measure may involve calculating the correspondence measure based on a plurality of phoneme edit distances. In one example, the processing device may select a set of spoken words (e.g., 3, 4, 5+ words) and compare the set of spoken words to content of the text source. A phoneme edit distance may be determined for each word in the set or for a combination of one or more of the words. The resulting numeric value may then be weighted, aggregated, or modified, to determine the correspondence measure.

At block 608, the processing device may transmit a signal to cease comparing audio data with the data of the text source responsive to determining the correspondence measure satisfies a threshold. Determining the correspondence measure satisfies the threshold may involve determining the correspondence measure is below a threshold value or above a threshold value. The determination may also be based on the duration of time that the correspondence measure satisfies or does not satisfy the threshold. Determining the correspondence measure satisfies the threshold may indicate the second duration of the audio data includes content that is different from content of the text source and may or may not indicate the audio data is absent any match with the data of the text source. Transmitting the signal may involve transmitting a signal to deactivate one or more microphones capturing audio data. In one example, the processing device may cause a computing device to prompt the user to exit a storytime mode in response to determining the second duration of the audio data is absent content of the text source. The prompt may be an audio prompt, a visual prompt, other prompt, or a combination thereof. Responsive to completing the operations described herein above with references to block 608, the method may terminate.

Figure 7:
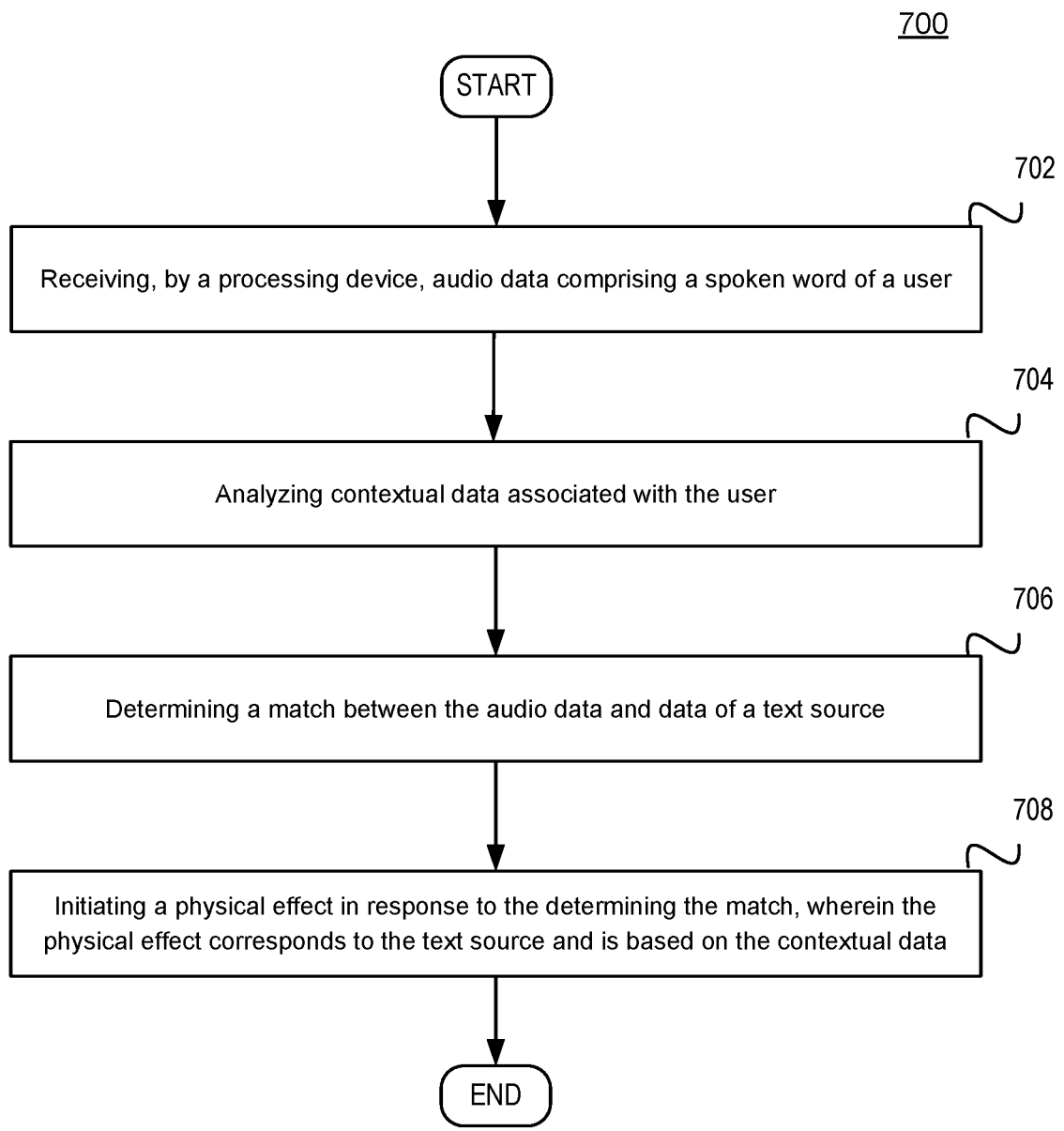
FIG. 7 is a flow diagram illustrating an example of method in accordance with an implementation of the disclosure.

Referring to FIG. 7, method 700 may be performed by the same processing device discussed above or a different processing device and may begin at block 702. At block 702, the processing device may receive audio data comprising a spoken word of a user. The spoken word may be associated with a text source the user is reading aloud and may include one or more other audible actions, such as page turns, spoken words not within the text source, and other audible actions captured from an environment of the user. In one example, the processing device may receive the audio data directly from one or more of the sensors in the form of an audio signal (e.g. for use in real time or perceived real time). In another example, the processing device may receive the audio data from a data store or another computing device. The audio data may be in any digital or analog format and may be accessed or received from within one or more storage objects (e.g., files, database records), data streams (e.g., audio stream, video stream), data signals, other data transmission or storage protocol, or a combination thereof.

At block 704, the processing device may analyze contextual data associated with the user. The contextual data may include sound data, light data, time data, weather data, calendar data, user profile data, other data, or a combination thereof. In some examples, the contextual data can be associated with a physical effect so that the processing device can provide physical effects that take into account the context of the user and the user's environment. In one example, the contextual data may include sound data of an environment of the user and the physical effect may include an acoustic effect at a volume based on the sound data. In another example, the contextual data may include light data of an environment of the user and the physical effect may include an optical effect that modifies a luminance of a light source based on the light data. In yet another example, the contextual data may include user profile data indicating an age of a child and the physical effect may include an acoustic effect selected based on the age of the child.

At block 706, the processing device may determine a match between the audio data and data of a text source. The processing device may identify the text source based on user input (e.g., audio data or touch data) and retrieve the data of the text source. The data of the text source may include phoneme data and determining the match may involve calculating a phoneme edit distance between the phoneme data of the text source and phoneme data of the audio data. In one example, determining the match between the audio data and data of a text source may involve detecting the audio data comprises a word of the text source using phoneme data of the text source.

At block 708, the processing device may initiate a physical effect in response to determining the match. The physical effect may correspond to the text source and be based on the contextual data. The physical effect may modify an environment of the user and may include at least one of an acoustic effect, an optical effect, and a haptic effect. The text source may include a word and initiating the physical effect may be responsive to detecting the audio data comprises the word. In one example, the processing device may select the physical effect based on the word of the text source and may update an attribute (e.g., volume or brightness) of the physical effect based on the contextual data. Responsive to completing the operations described herein above with references to block 708, the method may terminate.

Figure 8:
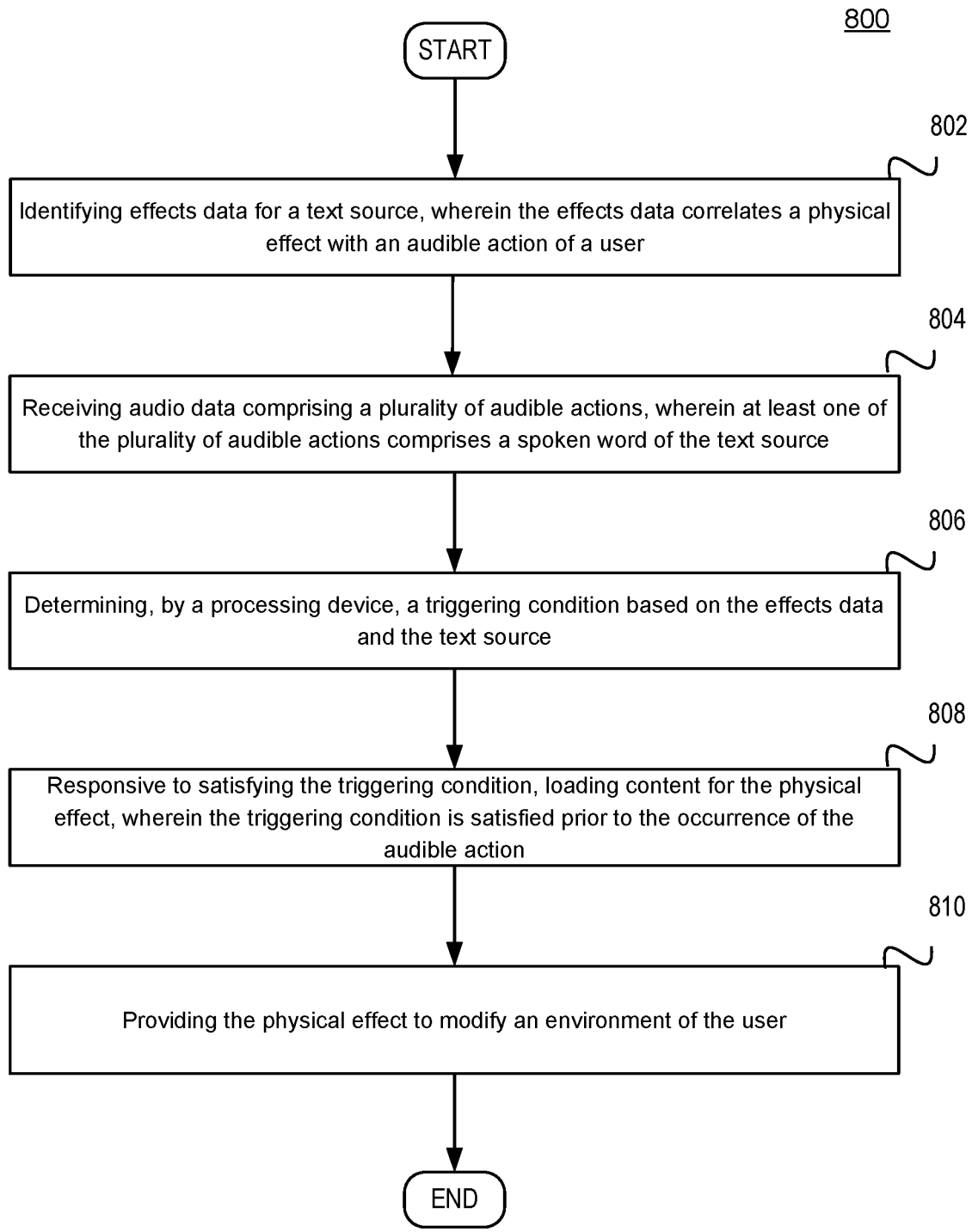
FIG. 8 is a flow diagram illustrating an example of method in accordance with an implementation of the disclosure.

Referring to FIG. 8, method 800 may be performed by processing devices of a server device or a client device and may begin at block 802. At block 802, the processing device may identify effects data for a text source, wherein the effects data correlates a physical effect with an audible action of a user. The effects data may indicate the physical effect and indicate a location in the text source that relates to the audible action. The location may correspond to a word, paragraph, page, or other location of the text source. In one example, the audible action may be a spoken word of the text source and the physical effect may be an acoustic effect corresponding to the spoken word. In another example, the audible action may include a page turn and the physical effect may be a modification of an existing acoustic effect, optical effect, or haptic effect.

At block 804, the processing device may receive audio data comprising a plurality of audible actions. The plurality of audible actions may include one or more spoken words of the text source and one or more other audible actions, such as page turns, spoken words not within the text source, and other audible actions captured from an environment of the user. In one example, the processing device may receive the audio data directly from one or more of the sensors in the form of an audio signal (e.g. for use in real time or near/perceived real time). In another example, the processing device may receive the audio data from a data store or another computing device. The audio data may be in any digital or analog format and may be accessed or received from within one or more storage objects (e.g., files, database records), data streams (e.g., audio stream, video stream), data signals, other data transmission or storage protocol, or a combination thereof.

At block 806, the processing device may determine a triggering condition based on the effects data and the text source. In one example, determining the triggering condition may involve determining the physical effect is associated with a first location in the text source and selecting a second location in the text source that is before the first location. The selection may be based on a reading speed and a load time associated with the physical effect and the second location may be associated with at least one of a particular instance of a word, a paragraph, a page, or a chapter of the text source. The processing device may then set the triggering condition to correspond with the second location in the text source. In another example, determining the triggering condition may involve calculating a duration of time to load the content based on an amount of the content for the physical effect and an amount of available computing resources. The computing resources may relate to one or more of networking bandwidth, storage space, or processing power and the duration may be longer when the available computing resources are lower. In one example, determining the time in the future that the audible action will occur may involve identifying a time to initiate the loading based on the calculated duration and the determined time of the audible action and initiating the loading of the content at or before the identified time. In another example, determining the time comprises calculating the time in the future based on a reading speed and a current reading location in the text source. In yet another example, determining the time comprises predicting a time a word of the text source will be spoken before the word is spoken.

At block 808, the processing device may load content for the physical effect responsive to satisfying the triggering condition. The triggering condition may be satisfied prior to the occurrence of the audible action.

At block 810, the processing device may provide the physical effect to modify an environment of the user. Responsive to completing the operations described herein above with references to block 810, the method may terminate.

The technology discussed herein includes multiple enhancements to a computing device with or without virtual assistant features. The below discussion includes multiple different enhancements that may be used individually or together to optimize the ability of the computing device to follow along while a text source is being read aloud and to provide special effects to supplement an environment of a user. In one example, the environment may include a parent reading a book aloud to one or more children. In another example, the environment may include one or more users providing a presentation, speech, or other performance to an audience. In either example, the technology may be used to enhance the environment with special effects based on an analysis of data associated with the text source. The special effects may be synchronized with particular portions of the text source, such as a particular spoken word or a page turn.

In a first example, an enhancement may be related to reading progress estimation based on phonetic fuzzy matching and confidence intervals and may relate to the field of computer-based recognition of human speech and, in particular, to enhancing the ability of a computer device to identify a reading location in a text source as a user reads the text source aloud. Many technical problems arise when a computing device attempts to use traditional virtual assistant features to follow along as a user reads a text source aloud. Some of the problems arise because traditional virtual assistant features perform speech recognition to translate audio into text/recognized words. The speech recognition typically involves an acoustic step that translates the audio into phonemes and a language step that translates the phonemes into text/recognized words. The language step often waits for subsequent spoken words to establish context before translating a spoken word into text. The language step introduces an unnecessary time delay and consumes additional computing resources. In addition, using the recognized text to perform a traditional text based comparison with the text source may be more error prone then performing a phonetic comparison (e.g., phoneme comparison). This often arises because many words that sound the same or sound similar may be spelled very differently and would yield false negatives when textually compared. In addition, a traditional textual comparison may not properly account for situations where a user may jump around when reading a text source. For example, portions of the text source may be skipped, repeated, or new content may be added. This may make it challenging to identify a current reading location within the text source and to correctly detect a reading speed. Aspects and implementations of the present technology address the above and other deficiencies by providing enhancements to enable a computing device to detect a current reading location in a text source as the text source is being read aloud. In one example, the technology may avoid the language step of traditional speech recognition by comparing the phoneme data derived from the audio with phoneme data derived from the text source. The text source may be a book, magazine, presentation, speech, script, or other source that includes a sequence of words. The technology may receive audio data that includes the words spoken by a user and may convert the audio data to phoneme data locally or with the assistance or a remote server (e.g., cloud service). The phoneme data of the audio and the text source may then be compared via a phonetic comparison as opposed to a more traditional textual comparison. The phonetic comparison may be accompanied with fuzzy matching to identify a location within the sequence of words (e.g., current reading location). Systems and methods described herein include technology that enhances the technical field of computer-based recognition of human speech. In particular, the technology disclosed enhances the latency, accuracy, and computing resources required to identify a current reading position. This may be the result of modifying the speech analysis process (e.g., speech recognition) to avoid translating the audio data into text/words. The technology may use a speech analysis process that translates the audio into phoneme data using an acoustic model but may avoid the language step that translates the phoneme data to text/words using a language model. Avoiding the language step reduces latency and the consumption of computing resources. Performing phoneme comparisons and using fuzzy matching may enhance the accuracy in identifying a current reading position because it may better compensate for non-linear reading of the text source (e.g., skipping, repeating, or adding content).

In a second example, an enhancement may be related to algorithmic determination of a story readers discontinuation of reading and may be related to the field of computer-based recognition of human speech and, in particular, to enhancing the ability of a computer device to determine a user is no longer reading content of a text source aloud. Many technical problems arise when a computing device attempts to use traditional virtual assistant features to follow along as a user reads a text source aloud. Some of the problems arise because a traditional virtual assistant may be unable to detect when a user has finished providing audio input if the user continues to talk about something else. This may result in the computing device to continue recording the audio of the user, which may be problematic if the user transitions to discussing something private. Detecting when a user has stopped reading from a text source may be more challenging when a user does not follow along with the text and skips, repeats, or adds new content while reading the text source aloud. Aspects and implementation of the present technology address the above and other deficiencies by enhancing the ability of a computing device to detect when a user has discontinued reading a text source. In one example, the technology may enable the virtual assistant to more accurately detect that the user has taken a break from reading the text source and may deactivate a microphone to avoid capturing private audio content. This may involve receiving audio data comprising the spoken word associated with a text source and comparing the audio data with data of the text source. The technology may calculate a correspondence measure between content of the audio data and the content of the text source. The correspondence measure may be probabilistic value that is based on a comparison of phoneme data, textual data, or other data and may involve using fuzzy matching logic. When the correspondence measure satisfies a threshold (e.g., below a minimum correspondence threshold), the technology may cause a signal to be transmitted that will cease the analysis of subsequent audio data. Systems and methods described herein include technology that enhances the technical field of computer-based recognition of human speech. In particular, the technology may address technical problems by avoiding an inadvertent recording of a user's private conversation by using comparisons that better compensate for non-linear reading of the text source (e.g., skipping, repeating, adding content). For example, the above technology may facilitate more accurate and/or more prompt automated control of the virtual assistant to record and/or process only pertinent audio. The technology may also enable the computing device to reduce power consumption by deactivating an audio sensor (e.g., microphone) and associated data processing when the computing device detects the user has stopped reading the text. Furthermore, the above technology may enable the computing device to reduce utilization of computing resources, such as processing capacity, network bandwidth, data storage and/or the like, that may otherwise be used to record and/or process the audio data once the user has stopped reading the text.

In a third example, an enhancement may be related to dynamic adjustment of story time special effects based on contextual data and may be related to the field of virtual assistants and, in particular, to enhancing the ability of a virtual assistant to provide special effects while a text source is being read aloud. Modern computing devices may be configured to adopt traditional virtual assistant features to provide sound effects that supplement an environment when a user is reading a book aloud. For example, when a user reads the word "bark" aloud the computing device may provide a barking sound effect. The sound effects are often provided by the same entity that provided the text source and may directly correspond with a portion of the text source. As a result, the special effects may be the same independent of the user or environment and may not be optimized to the particular reading environment of a user. Aspects and implementation of the present technology address the above and other deficiencies by enabling a computing device to provide a wide variety of special effects that are based on the user's environment. In one example, the technology may enable the computing device to analyze contextual data of an environment of the user and to select or customize the special effects. The special effects may be physical effects that alter the environment of the user to include acoustic effects (e.g., music, sound effects music), optical effects (e.g., flashing lights, ambient light), haptic effects (e.g., vibrations, wind, temperature changes), other effects, or a combination thereof. The technology may involve receiving and analyzing contextual data associated with the user. The contextual data may be related to the weather, lighting, time of day, user feedback, user profile, other information, or a combination thereof. The technology may select or modify a physical effect that corresponds to the text source based on the contextual data. For example, this may result in selecting or modifying a volume, brightness, speed, tone, or other attribute of the physical effect. Systems and methods described herein include technology that enhances the technical field of virtual assistants and home automation. In particular, the technology may enable a computing device to optimize an environment by using contextual data about the user and the environment to add, remove, or modify physical effects to enhance a listening experience of the user.

In a fourth example, an enhancement may be related to the detection of story reader progress for pre-caching special effects and may be related to the field of virtual assistants and, in particular, to enhancing the ability of a virtual assistant to pre-cache special effects for a text source that is being read aloud. Many technical problems arise when attempting to use traditional virtual assistant features to provide sound effects that are syncronized with the spoken content of a text source. Some of the problems arise because a traditional virtual assistant performs speech recognition to translate audio into text and then performs a comparison based on the text. The speech recognition typically involves an acoustic step that translates the audio into phonemes and a language step that translates the phonemes into text. The language step often waits for subsequent spoken words to establish context before translating a spoken word into text. The language step introduces a time delay and consumes additional computing resources on a computing device that may be resource constrained. The delay may be further compounded because the sound effects may be large audio files that are downloaded from a remote data source. A traditional approach may involve downloading the sound effects in response to detecting a spoken word but the delay may result in the special effect being provided long after the word is spoken. Another approach may involve downloading all of the sound effects when the text source is initially identified but that may be problematic when the computing device is a resource constrained device (e.g., smart speaker). Aspects and implementation of the present technology address the above and other deficiencies by providing enhancements to a computing device to enhance its ability to conserve computing resources and still provide special effects that are syncronized with a text source being read aloud. This may be accomplished by using data of a text source (e.g., book) to predict future audible actions and to prefetch the associated physical effects before the respective audible action arises. In one example, the technology may enable the computing device to predict when a user will reach a word in the text source before the word is spoken. This may involve identifying effects data for a text source that correlate a physical effect with one or more audible actions of a user. The audible actions may include a word spoken by the user or may be a page turn, book close, or other action that produces an audible response. The technology may determine a triggering condition based on a current reading location, reading speed, other data, or a combination thereof. In response to detecting that the triggering condition is satisfied, the technology may cause the computing device to load content for the physical effect and subsequently provide the physical effect to modify an environment of the user. Systems and methods described herein include technology that enhances the technical field of pre-caching based on recognition of human speech. In particular, the technology disclosed may address technical problems associated with resource consumption when analyzing speech and downloading special effects. The technology may also reduce a delay in providing special effects so that the special effects are better synchronized with the human speech.

Figure 9:
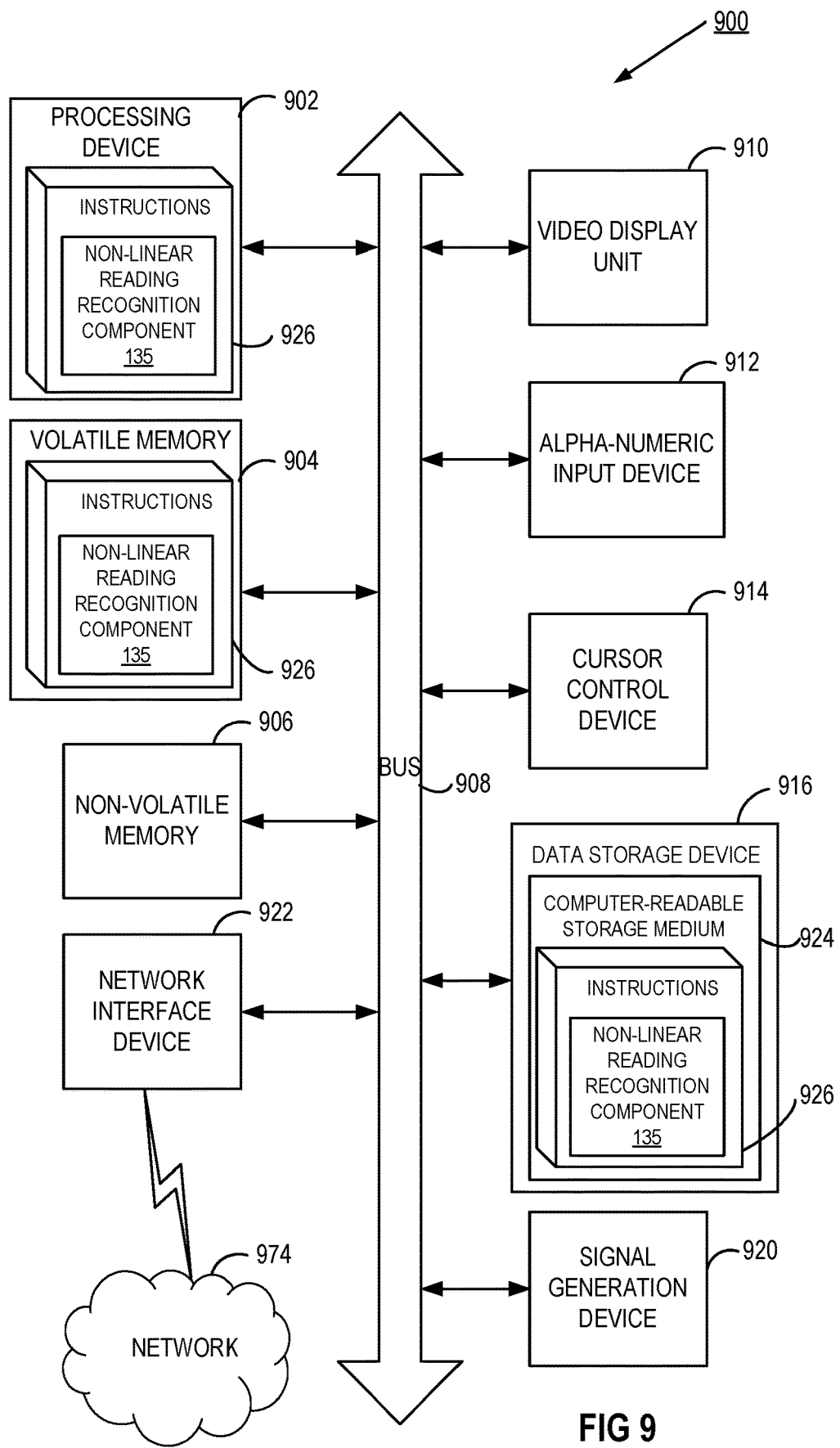
FIG. 9 is a block diagram illustrating another example of a computing device in accordance with an implementation of the disclosure.

FIG. 9 depicts a block diagram of a computer system operating in accordance with one or more aspects of the present disclosure. In various illustrative examples, computer system 900 may correspond to computing device 130 of FIGS. 2-4. The computer system may be included within a data center that supports virtualization. In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alphanumeric input device 912 (e.g., a keyboard), a cursor control device 914 (e.g., a mouse), and a signal generation device 920.

Data storage device 916 may include a non-transitory computer-readable storage medium 924 on which may store instructions 926 encoding any one or more of the methods or functions described herein, including instructions for implementing method 500, 600, 700, or 800 and any components or modules in FIGS. 1-4.

Instructions 926 may also reside, completely or partially, within volatile memory 904 and/or within processing device 902 during execution thereof by computer system 900, hence, volatile memory 904, and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 500, 600, 700, 800 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    determining phoneme data of a text source, the text source comprising a sequence of words;
    receiving audio data comprising a word spoken by a user as the user reads the text source aloud;
    performing, by a processing device, a phonetic comparison of the phoneme data of the text source and phoneme data of the audio data; and
    identifying a reading location in the text source as the user reads the text source aloud based on the phonetic comparison of the phoneme data of the text source and the phoneme data of the audio data.

2. The method of claim 1, wherein the text source is a book and the reading location is a current reading location in the book.

3. The method of claim 1, wherein the phoneme data of the text source comprises a phonetic encoding of the sequence of words, the phonetic encoding comprising one or more sequences of phonetic values.

4. The method of claim 1, wherein performing the phonetic comparison comprises calculating a phoneme edit distance between phoneme data of the audio data and phoneme data of the text source.

5. The method of claim 1, wherein performing the phonetic comparison comprises calculating a numeric value representing a similarity between two or more sequences of phonetic values.

6. The method of claim 1, wherein performing the phonetic comparison comprises performing a fuzzy match between phoneme data corresponding to the audio data and the phoneme data of the text source.

7. The method of claim 1, wherein performing the phonetic comparison comprises comparing the audio data and the text source without any conversion of the audio data to text using speech recognition.

8. The method of claim 1, wherein identifying the reading location in the text source comprises:
    determining the spoken word matches a particular word in the sequence of words based on the phoneme data of text source; and
    selecting the location of the particular word based on the phoneme data of the text source.

9. The method of claim 1, further comprising:
    accessing textual data of the text source;
    generating phoneme data based on the textual data; and
    associating phoneme data with the text source.

10. A system comprising:
    a memory; and
    a processing device, coupled to the memory, to:
    determine phoneme data of a text source, the text source comprising a sequence of words;
    receive audio data comprising a word spoken by a user as the user reads the text source aloud;
    perform a phonetic comparison of the phoneme data of the text source and phoneme data of the audio data; and
    identify a reading location in the text source as the user reads the text source aloud based on the phonetic comparison of the phoneme data of the text source and the phoneme data of the audio data.

11. The system of claim 10, wherein the text source is a book and the reading location is a current reading location in the book.

12. The system of claim 10, wherein the phoneme data of the text source comprises a phonetic encoding of the sequence of words, the phonetic encoding comprising one or more sequences of phonetic values.

13. The system of claim 10, wherein to perform the phonetic comparison, the processing device is further to calculate a phoneme edit distance between phoneme data of the audio data and phoneme data of the text source.

14. The system of claim 10, wherein to perform the phonetic comparison, the processing device is further to calculate a numeric value representing a similarity between two or more sequences of phonetic values.

15. The system of claim 10, wherein to perform the phonetic comparison, the processing device is further to perform a fuzzy match between phoneme data corresponding to the audio data and the phoneme data of the text source.

16. The system of claim 10, wherein to perform the phonetic comparison, the processing device is to compare the audio data and the text source without any conversion of the audio data to text using speech recognition.

17. The system of claim 10, wherein to identify the reading location in the text source, the processing device is to perform operations comprising:
    determining the spoken word matches a particular word in the sequence of words based on the phoneme data of text source; and selecting the location of the particular word based on the phoneme data of the text source.

18. The system of claim 10, the processing device is further to:
access textual data of the text source;
generate phoneme data based on the textual data; and
associate phoneme data with the text source.

19. The system of claim 10, wherein the system is configured to implement a virtual assistant.

20. A non-transitory computer readable medium storing program instructions, which when executed by a processing device, causes the processing device to perform operations comprising:
determining phoneme data of a text source, the text source comprising a sequence of words;
receiving audio data comprising a word spoken by a user as the user reads the text source aloud;
performing a phonetic comparison of the phoneme data of the text source and phoneme data of the audio data; and
identifying a reading location in the text source as the user reads the text source aloud based on the phonetic comparison of the phoneme data of the text source and the phoneme data of the audio data.

\* \* \* \* \*